(12) United States Patent
Puchala et al.

(10) Patent No.: US 10,348,639 B2
(45) Date of Patent: Jul. 9, 2019

(54) USE OF VIRTUAL ENDPOINTS TO IMPROVE DATA TRANSMISSION RATES

(71) Applicant: Amazon Technologies, Inc., Seattle, WA (US)

(72) Inventors: Katarzyna Anna Puchala, Kirkland, WA (US); Alex Xiaoye Zhang, Seattle, WA (US); David Alexander Dunlap, Seattle, WA (US); Craig Wesley Howard, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 126 days.

(21) Appl. No.: 14/975,157

(22) Filed: Dec. 18, 2015

(65) Prior Publication Data

US 2017/0180267 A1 Jun. 22, 2017

(51) Int. Cl.
*G06F 15/177* (2006.01)
*H04L 12/919* (2013.01)
(Continued)

(52) U.S. Cl.
CPC ............ *H04L 47/765* (2013.01); *H04L 45/02* (2013.01); *H04L 47/193* (2013.01); *H04L 67/06* (2013.01); *H04L 67/327* (2013.01)

(58) Field of Classification Search
CPC .. H04L 43/18; H04L 65/4076; H04L 61/3025
See application file for complete search history.

(56) References Cited

U.S. PATENT DOCUMENTS 5,063,500 A 11/1991 Shorter
5,341,477 A 8/1994 Pitkin et al.
(Continued)

FOREIGN PATENT DOCUMENTS

| CA | 2741 895 A1 | 5/2010 |
|---|---|---|
| CN | 1422468 A | 6/2003 |

(Continued)

OTHER PUBLICATIONS

"Non-Final Office Action dated Jan. 3, 2012," U.S. Appl. No. 12/652,541, filed Jan. 3, 2012; 35 pages.
(Continued)

*Primary Examiner* — Brian Whipple
*Assistant Examiner* — Tesfu N Mekonen
(74) *Attorney, Agent, or Firm* — Knobbe, Martens, Olson & Bear, LLP

(57) ABSTRACT

Systems and methods are described that enable high-data-rate network communications by use of a data transmission system, which can at least partially redirect data transmitted between two computing devices on a public network to a private network. The data transmission system may include a variety of endpoints at different locations, such that source and destination computing devices may pass information into and out of the data transmission system via the endpoints. To ensure that endpoints are able to communication with each computing device via a path of sufficient network quality, the data transmission system may dynamically generate additional endpoints within points of presence of the system. Where no endpoints or points of presence have a connection of sufficient quality to a source and destination computing device, the data transmission system may decline to transmit data, and instruct the source or destination computing devices to utilize traditional communication channels.

19 Claims, 8 Drawing Sheets

(51) Int. Cl.
*H04L 29/08* (2006.01)
*H04L 12/751* (2013.01)
*H04L 12/801* (2013.01)

(56) References Cited

U.S. PATENT DOCUMENTS

| | | |
|---|---|---|
| 5,459,837 A | 10/1995 | Caccavale |
| 5,611,049 A | 3/1997 | Pitts |
| 5,701,467 A | 12/1997 | Freeston |
| 5,764,910 A | 6/1998 | Shachar |
| 5,774,660 A | 6/1998 | Brendel et al. |
| 5,852,717 A | 12/1998 | Bhide et al. |
| 5,892,914 A | 4/1999 | Pitts |
| 5,893,116 A | 4/1999 | Simmonds et al. |
| 5,895,462 A | 4/1999 | Toki |
| 5,905,248 A | 5/1999 | Russell et al. |
| 5,933,811 A | 8/1999 | Angles et al. |
| 5,937,427 A | 8/1999 | Shinagawa et al. |
| 5,974,454 A | 10/1999 | Apfel et al. |
| 5,991,306 A | 11/1999 | Burns et al. |
| 5,999,274 A | 12/1999 | Lee et al. |
| 6,016,512 A | 1/2000 | Huitema |
| 6,018,619 A | 1/2000 | Allard et al. |
| 6,026,452 A | 2/2000 | Pitts |
| 6,038,601 A | 3/2000 | Lambert et al. |
| 6,052,718 A | 4/2000 | Gifford |
| 6,078,960 A | 6/2000 | Ballard |
| 6,085,234 A | 7/2000 | Pitts et al. |
| 6,092,100 A | 7/2000 | Berstis et al. |
| 6,098,096 A | 8/2000 | Tsirigotis et al. |
| 6,108,703 A | 8/2000 | Leighton et al. |
| 6,128,279 A | 10/2000 | O'Neil et al. |
| 6,151,631 A | 11/2000 | Ansell et al. |
| 6,157,942 A | 12/2000 | Chu et al. |
| 6,167,438 A | 12/2000 | Yates et al. |
| 6,167,446 A | 12/2000 | Lister et al. |
| 6,173,316 B1 | 1/2001 | De Boor et al. |
| 6,182,111 B1 | 1/2001 | Inohara et al. |
| 6,182,125 B1 | 1/2001 | Borella et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,288 B1 | 4/2001 | Byrne |
| 6,243,761 B1 | 6/2001 | Mogul et al. |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,324,580 B1 | 11/2001 | Jindal et al. |
| 6,330,602 B1 | 12/2001 | Law et al. |
| 6,338,082 B1 | 1/2002 | Schneider |
| 6,345,308 B1 | 2/2002 | Abe |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,377,257 B1 | 4/2002 | Borrel et al. |
| 6,386,043 B1 | 5/2002 | Millins |
| 6,389,532 B1 | 5/2002 | Gupta et al. |
| 6,405,252 B1 | 6/2002 | Gupta et al. |
| 6,408,360 B1 | 6/2002 | Chamberlain et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,442,165 B1 | 8/2002 | Sitaraman et al. |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 11/2002 | Swildens et al. |
| 6,484,161 B1 | 11/2002 | Chipalkatti et al. |
| 6,493,765 B1 | 12/2002 | Cunningham et al. |
| 6,505,241 B2 | 1/2003 | Pitts |
| 6,523,036 B1 | 2/2003 | Hickman et al. |
| 6,529,910 B1 | 3/2003 | Fleskes |
| 6,529,953 B1 | 3/2003 | Van Renesse |
| 6,553,413 B1 | 4/2003 | Leighton et al. |
| 6,560,610 B1 | 5/2003 | Eatherton et al. |
| 6,611,873 B1 | 8/2003 | Kanehara |
| 6,622,168 B1 | 9/2003 | Datta |
| 6,643,357 B2 | 11/2003 | Lumsden |
| 6,643,707 B1 | 11/2003 | Booth |
| 6,654,807 B2 | 11/2003 | Farber et al. |
| 6,658,462 B1 | 12/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,687,846 B1 | 2/2004 | Adrangi et al. |
| 6,694,358 B1 | 2/2004 | Swildens et al. |
| 6,697,805 B1 | 2/2004 | Choquier et al. |
| 6,718,324 B2 | 4/2004 | Edlund et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,760,721 B1 | 7/2004 | Chasen et al. |
| 6,769,031 B1 | 7/2004 | Bero |
| 6,782,398 B1 | 8/2004 | Bahl |
| 6,785,704 B1 | 8/2004 | McCanne |
| 6,795,434 B1 | 9/2004 | Kumar et al. |
| 6,799,214 B1 | 9/2004 | Li |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 * | 12/2004 | Jungck .............. H04L 47/10 370/475 |
| 6,862,607 B1 | 3/2005 | Vermeulen |
| 6,868,439 B2 | 3/2005 | Basu et al. |
| 6,874,017 B1 | 3/2005 | Inoue et al. |
| 6,917,951 B2 | 7/2005 | Orbits et al. |
| 6,925,499 B1 | 8/2005 | Chen et al. |
| 6,928,467 B2 | 8/2005 | Peng et al. |
| 6,928,485 B1 | 8/2005 | Krishnamurthy et al. |
| 6,941,562 B2 | 9/2005 | Gao et al. |
| 6,950,848 B1 | 9/2005 | Yousefi'zadeh et al. |
| 6,963,850 B1 | 11/2005 | Bezos et al. |
| 6,976,090 B2 | 12/2005 | Ben-Shaul et al. |
| 6,981,017 B1 | 12/2005 | Kasriel et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,027,582 B2 | 4/2006 | Khello et al. |
| 7,031,445 B2 | 4/2006 | Lumsden |
| 7,032,010 B1 | 4/2006 | Swildens et al. |
| 7,058,633 B1 | 6/2006 | Gnagy et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,096,266 B2 | 8/2006 | Lewin et al. |
| 7,099,936 B2 | 8/2006 | Chase et al. |
| 7,103,645 B2 | 9/2006 | Leighton et al. |
| 7,114,160 B2 | 9/2006 | Suryanarayana et al. |
| 7,117,262 B2 | 10/2006 | Bai et al. |
| 7,133,905 B2 | 11/2006 | Dilley et al. |
| 7,136,922 B2 | 11/2006 | Sundaram et al. |
| 7,139,808 B2 | 11/2006 | Anderson et al. |
| 7,139,821 B1 | 11/2006 | Shah et al. |
| 7,143,169 B1 | 11/2006 | Champagne et al. |

(56) References Cited

U.S. PATENT DOCUMENTS

| | | |
|---|---|---|
| 7,143,170 B2 | 11/2006 | Swildens et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,174,382 B2 | 2/2007 | Ramanathan et al. |
| 7,185,046 B2 | 2/2007 | Ferstl et al. |
| 7,185,063 B1 | 2/2007 | Kasriel et al. |
| 7,185,084 B2 | 2/2007 | Sirivara et al. |
| 7,188,214 B1 | 3/2007 | Kasriel et al. |
| 7,194,522 B1 | 3/2007 | Swildens et al. |
| 7,194,552 B1 | 3/2007 | Schneider |
| 7,200,667 B2 | 4/2007 | Teodosiu et al. |
| 7,216,170 B2 | 5/2007 | Ludvig et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 | 7/2007 | Wein et al. |
| 7,249,196 B1 | 7/2007 | Peiffer et al. |
| 7,251,675 B1 | 7/2007 | Kamakura et al. |
| 7,254,626 B1 | 8/2007 | Kommula et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,784 B1 | 9/2007 | Kasriel et al. |
| 7,272,227 B1 | 9/2007 | Beran |
| 7,274,658 B2 | 9/2007 | Bornstein et al. |
| 7,284,056 B2 | 10/2007 | Ramig |
| 7,289,519 B1 | 10/2007 | Liskov |
| 7,293,093 B2 | 11/2007 | Leighton |
| 7,308,499 B2 | 12/2007 | Chavez |
| 7,310,686 B2 | 12/2007 | Uysal |
| 7,316,648 B2 | 1/2008 | Kelly et al. |
| 7,318,074 B2 | 1/2008 | Iyengar et al. |
| 7,320,131 B1 | 1/2008 | O'Toole, Jr. |
| 7,321,918 B2 | 1/2008 | Burd et al. |
| 7,337,968 B2 | 3/2008 | Wilz, Sr. et al. |
| 7,339,937 B2 | 3/2008 | Mitra et al. |
| 7,340,505 B2 | 3/2008 | Lisiecki et al. |
| 7,363,291 B1 | 4/2008 | Page |
| 7,363,626 B2 | 4/2008 | Koutharapu et al. |
| 7,370,089 B2 | 5/2008 | Boyd et al. |
| 7,372,809 B2 | 5/2008 | Chen |
| 7,373,416 B2 | 5/2008 | Kagan et al. |
| 7,376,736 B2 | 5/2008 | Sundaram et al. |
| 7,380,078 B2 | 5/2008 | Ikegaya et al. |
| 7,389,354 B1 | 6/2008 | Sitaraman et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,409,712 B1 | 8/2008 | Brooks et al. |
| 7,430,610 B2 | 9/2008 | Pace et al. |
| 7,441,045 B2 | 10/2008 | Skene et al. |
| 7,441,261 B2 | 10/2008 | Slater et al. |
| 7,454,457 B1 | 11/2008 | Lowery et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,505,464 B2 | 3/2009 | Okmianski et al. |
| 7,506,034 B2 | 3/2009 | Coates et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 | 8/2009 | Swildens et al. |
| 7,581,009 B1 | 8/2009 | Hsu et al. |
| 7,593,935 B2 | 9/2009 | Sullivan |
| 7,594,189 B1 | 9/2009 | Walker et al. |
| 7,596,619 B2 | 9/2009 | Leighton et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,631,101 B2 | 12/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,684,394 B1 | 3/2010 | Cutbill et al. |
| 7,685,109 B1 | 3/2010 | Ransil et al. |
| 7,685,251 B2 | 3/2010 | Houlihan et al. |
| 7,693,813 B1 | 4/2010 | Cao et al. |
| 7,693,959 B2 | 4/2010 | Leighton et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,756,965 B2 | 7/2010 | Joshi |
| 7,757,202 B2 | 7/2010 | Dahlsted et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,783,727 B1 | 8/2010 | Foley et al. |
| 7,787,380 B1 | 8/2010 | Aggarwal et al. |
| 7,792,989 B2 | 9/2010 | Toebes et al. |
| 7,805,516 B2 | 9/2010 | Kettler et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,853,719 B1 | 12/2010 | Cao et al. |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 2/2011 | Todd et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |

(56) References Cited

U.S. PATENT DOCUMENTS

| | | | |
|---|---|---|---|
| 7,979,509 | B1 | 7/2011 | Malmskog et al. |
| 7,991,910 | B2 | 8/2011 | Richardson et al. |
| 7,996,533 | B2 | 8/2011 | Leighton et al. |
| 7,996,535 | B2 | 8/2011 | Auerbach |
| 8,000,724 | B1 | 8/2011 | Rayburn et al. |
| 8,001,187 | B2 | 8/2011 | Stochosky |
| 8,010,707 | B2 | 8/2011 | Elzur et al. |
| 8,019,869 | B2 | 9/2011 | Kriegsman |
| 8,024,441 | B2 | 9/2011 | Kommula et al. |
| 8,028,090 | B2 | 9/2011 | Richardson et al. |
| 8,041,773 | B2 | 10/2011 | Abu-Ghazaleh et al. |
| 8,041,809 | B2 | 10/2011 | Sundaram et al. |
| 8,041,818 | B2 | 10/2011 | Gupta et al. |
| 8,042,054 | B2 | 10/2011 | White et al. |
| 8,065,275 | B2 | 11/2011 | Eriksen et al. |
| 8,069,231 | B2 | 11/2011 | Schran et al. |
| 8,073,940 | B1 | 12/2011 | Richardson et al. |
| 8,082,348 | B1 | 12/2011 | Averbuj et al. |
| 8,108,623 | B2 | 1/2012 | Krishnaprasad et al. |
| 8,117,306 | B1 | 2/2012 | Baumback et al. |
| 8,122,098 | B1 | 2/2012 | Richardson et al. |
| 8,122,124 | B1 | 2/2012 | Baumback et al. |
| 8,132,242 | B1 | 3/2012 | Wu |
| 8,135,820 | B2 | 3/2012 | Richardson et al. |
| 8,156,199 | B1 | 4/2012 | Hoche-Mong et al. |
| 8,156,243 | B2 | 4/2012 | Richardson et al. |
| 8,175,863 | B1 | 5/2012 | Ostermeyer et al. |
| 8,190,682 | B2 | 5/2012 | Paterson-Jones et al. |
| 8,195,837 | B2 | 6/2012 | McCarthy et al. |
| 8,209,695 | B1 | 6/2012 | Pruyne et al. |
| 8,224,971 | B1 | 7/2012 | Miller et al. |
| 8,224,986 | B1 | 7/2012 | Liskov et al. |
| 8,224,994 | B1 | 7/2012 | Schneider |
| 8,234,403 | B2 | 7/2012 | Richardson et al. |
| 8,239,530 | B2 | 8/2012 | Sundaram et al. |
| 8,250,135 | B2 | 8/2012 | Driesen et al. |
| 8,250,211 | B2 | 8/2012 | Swildens et al. |
| 8,250,219 | B2 | 8/2012 | Raciborski et al. |
| 8,266,288 | B2 | 9/2012 | Banerjee et al. |
| 8,266,327 | B2 | 9/2012 | Kumar et al. |
| 8,271,471 | B1 | 9/2012 | Kamvar et al. |
| 8,280,998 | B2 | 10/2012 | Joshi |
| 8,281,035 | B2 | 10/2012 | Farber et al. |
| 8,291,046 | B2 | 10/2012 | Farber et al. |
| 8,291,117 | B1 | 10/2012 | Eggleston et al. |
| 8,296,393 | B2 | 10/2012 | Alexander et al. |
| 8,301,600 | B1 | 10/2012 | Helmick et al. |
| 8,301,645 | B1 | 10/2012 | Crook |
| 8,321,568 | B2 | 11/2012 | Sivasubramanian et al. |
| 8,356,074 | B1 | 1/2013 | Ehrlich et al. |
| 8,380,831 | B2 | 2/2013 | Barber |
| 8,380,851 | B2 | 2/2013 | McCarthy et al. |
| 8,392,928 | B1 | 3/2013 | Forys et al. |
| 8,402,137 | B2 | 3/2013 | Sivasuramanian et al. |
| 8,423,408 | B1 | 4/2013 | Barnes et al. |
| 8,423,662 | B1 | 4/2013 | Weihl et al. |
| 8,433,749 | B2 | 4/2013 | Wee et al. |
| 8,443,167 | B1 | 5/2013 | Fallone et al. |
| 8,447,831 | B1 | 5/2013 | Sivasubramanian et al. |
| 8,447,876 | B2 | 5/2013 | Verma et al. |
| 8,452,745 | B2 | 5/2013 | Ramakrishna |
| 8,452,874 | B2 | 5/2013 | MacCarthaigh et al. |
| 8,463,877 | B1 | 6/2013 | Richardson |
| 8,468,222 | B1 | 6/2013 | Sakata et al. |
| 8,468,245 | B2 | 6/2013 | Farber et al. |
| 8,473,613 | B2 | 6/2013 | Farber et al. |
| 8,478,903 | B2 | 7/2013 | Farber et al. |
| 8,504,721 | B2 | 8/2013 | Hsu et al. |
| 8,510,428 | B2 | 8/2013 | Joshi |
| 8,510,807 | B1 | 8/2013 | Elazary et al. |
| 8,521,851 | B1 | 8/2013 | Richardson et al. |
| 8,521,876 | B2 | 8/2013 | Goodman et al. |
| 8,521,880 | B1 | 8/2013 | Richardson et al. |
| 8,521,885 | B1 | 8/2013 | Richardson et al. |
| 8,521,908 | B2 | 8/2013 | Holmes et al. |
| 8,526,405 | B2 | 9/2013 | Curtis et al. |
| 8,527,639 | B1 | 9/2013 | Liskov et al. |
| 8,527,645 | B1 | 9/2013 | Proffit et al. |
| 8,527,658 | B2 | 9/2013 | Holmes et al. |
| 8,549,646 | B2 | 10/2013 | Stavrou et al. |
| 8,572,208 | B2 | 10/2013 | Farber et al. |
| 8,572,210 | B2 | 10/2013 | Farber et al. |
| 8,577,992 | B1 | 11/2013 | Richardson et al. |
| 8,589,996 | B2 | 11/2013 | Ma et al. |
| 8,606,996 | B2 | 12/2013 | Richardson et al. |
| 8,612,565 | B2 | 12/2013 | Schneider |
| 8,615,549 | B2 | 12/2013 | Knowles et al. |
| 8,619,780 | B1 | 12/2013 | Brandwine |
| 8,626,950 | B1 | 1/2014 | Richardson et al. |
| 8,635,340 | B1 | 1/2014 | Schneider |
| 8,639,817 | B2 | 1/2014 | Sivasubramanian et al. |
| 8,645,539 | B2 | 2/2014 | McCarthy et al. |
| 8,676,918 | B2 | 3/2014 | Richardson et al. |
| 8,683,023 | B1 | 3/2014 | Brandwine et al. |
| 8,683,076 | B1 | 3/2014 | Farber et al. |
| 8,688,837 | B1 | 4/2014 | Richardson et al. |
| 8,712,950 | B2 | 4/2014 | Smith et al. |
| 8,732,309 | B1 | 5/2014 | Richardson et al. |
| 8,745,177 | B1 | 6/2014 | Kazerani et al. |
| 8,756,322 | B1 | 6/2014 | Lynch |
| 8,756,325 | B2 | 6/2014 | Sivasubramanian et al. |
| 8,756,341 | B1 | 6/2014 | Richardson et al. |
| 8,782,236 | B1 | 7/2014 | Marshall et al. |
| 8,782,279 | B2 | 7/2014 | Eggleston et al. |
| 8,812,727 | B1 | 8/2014 | Sorenson, III et al. |
| 8,819,283 | B2 | 8/2014 | Richardson et al. |
| 8,826,032 | B1 | 9/2014 | Yahalom et al. |
| 8,904,009 | B1 | 12/2014 | Marshall et al. |
| 8,914,514 | B1 | 12/2014 | Jenkins et al. |
| 8,924,528 | B1 | 12/2014 | Richardson et al. |
| 8,930,513 | B1 | 1/2015 | Richardson et al. |
| 8,930,544 | B2 | 1/2015 | Richardson et al. |
| 8,935,744 | B2 * | 1/2015 | Osterweil ............ H04L 61/1511 726/1 |
| 8,938,526 | B1 | 1/2015 | Richardson et al. |
| 8,949,161 | B2 | 2/2015 | Borst et al. |
| 8,949,459 | B1 | 2/2015 | Scholl |
| 8,966,318 | B1 | 2/2015 | Shah |
| 8,972,580 | B2 * | 3/2015 | Fleischman ............ H04L 61/20 709/217 |
| 9,003,035 | B1 * | 4/2015 | Richardson ............ H04L 61/10 709/224 |
| 9,003,040 | B2 | 4/2015 | MacCarthaigh et al. |
| 9,009,286 | B2 | 4/2015 | Sivasubramanian et al. |
| 9,009,334 | B1 | 4/2015 | Jenkins et al. |
| 9,021,127 | B2 | 4/2015 | Richardson et al. |
| 9,021,128 | B2 * | 4/2015 | Sivasubramanian ....................... H04L 29/12132 709/203 |
| 9,021,129 | B2 | 4/2015 | Richardson et al. |
| 9,026,616 | B2 | 5/2015 | Sivasubramanian et al. |
| 9,037,975 | B1 | 5/2015 | Taylor et al. |
| 9,075,777 | B1 | 7/2015 | Pope et al. |
| 9,075,893 | B1 | 7/2015 | Jenkins |
| 9,083,675 | B2 | 7/2015 | Richardson et al. |
| 9,083,743 | B1 | 7/2015 | Patel et al. |
| 9,106,701 | B2 | 8/2015 | Richardson et al. |
| 9,116,803 | B1 | 8/2015 | Agrawal et al. |
| 9,130,756 | B2 | 9/2015 | Richardson et al. |
| 9,130,977 | B2 | 9/2015 | Zisapel et al. |
| 9,137,302 | B1 | 9/2015 | Makhijani et al. |
| 9,154,551 | B1 | 10/2015 | Watson |
| 9,160,703 | B2 | 10/2015 | Richardson et al. |
| 9,172,674 | B1 | 10/2015 | Patel et al. |
| 9,176,894 | B2 | 11/2015 | Marshall et al. |
| 9,185,012 | B2 | 11/2015 | Richardson et al. |
| 9,191,338 | B2 | 11/2015 | Richardson et al. |
| 9,191,458 | B2 | 11/2015 | Richardson et al. |
| 9,195,996 | B1 | 11/2015 | Walsh et al. |
| 9,208,097 | B2 | 12/2015 | Richardson et al. |
| 9,210,235 | B2 | 12/2015 | Sivasubramanian et al. |
| 9,237,087 | B1 | 1/2016 | Risbood et al. |
| 9,237,114 | B2 | 1/2016 | Richardson et al. |
| 9,240,954 | B1 | 1/2016 | Ellsworth et al. |

(56) References Cited

U.S. PATENT DOCUMENTS

| | | |
|---|---|---|
| 9,246,776 B2 | 1/2016 | Ellsworth et al. |
| 9,251,112 B2 | 2/2016 | Richardson et al. |
| 9,253,065 B2 | 2/2016 | Richardson et al. |
| 9,276,812 B1 | 3/2016 | Nagargadde et al. |
| 9,294,391 B1 | 3/2016 | Mostert |
| 9,323,577 B2 | 4/2016 | Marr et al. |
| 9,332,078 B2 | 5/2016 | Sivasubramanian et al. |
| 9,386,038 B2 | 7/2016 | Martini |
| 9,391,949 B1 | 7/2016 | Richardson et al. |
| 9,407,676 B2 | 8/2016 | Archer et al. |
| 9,407,681 B1 | 8/2016 | Richardson et al. |
| 9,407,699 B2 | 8/2016 | Sivasubramanian et al. |
| 9,444,718 B2 | 9/2016 | Khakpour et al. |
| 9,444,759 B2 | 9/2016 | Richardson et al. |
| 9,479,476 B2 | 10/2016 | Richardson et al. |
| 9,495,338 B1 | 11/2016 | Hollis et al. |
| 9,497,259 B1 | 11/2016 | Richardson et al. |
| 9,515,949 B2 | 12/2016 | Richardson et al. |
| 9,525,659 B1 | 12/2016 | Sonkin et al. |
| 9,544,394 B2 | 1/2017 | Richardson et al. |
| 9,571,389 B2 | 2/2017 | Richardson et al. |
| 9,584,328 B1 | 2/2017 | Graham-cumming |
| 9,590,946 B2 | 3/2017 | Richardson et al. |
| 9,608,957 B2 | 3/2017 | Sivasubramanian et al. |
| 9,621,660 B2 | 4/2017 | Sivasubramanian et al. |
| 9,628,509 B2 | 4/2017 | Holloway et al. |
| 9,628,554 B2 | 4/2017 | Marshall et al. |
| 9,645,808 B1 | 5/2017 | Turpie |
| 9,703,713 B2 | 7/2017 | Nadgowda |
| 9,705,922 B2 | 7/2017 | Foxhoven et al. |
| 9,712,325 B2 | 7/2017 | Richardson et al. |
| 9,712,484 B1 | 7/2017 | Richardson et al. |
| 9,734,472 B2 | 8/2017 | Richardson et al. |
| 9,742,795 B1 | 8/2017 | Radlein et al. |
| 9,760,420 B1 | 9/2017 | Letz et al. |
| 9,774,619 B1 | 9/2017 | Radlein et al. |
| 9,787,599 B2 | 10/2017 | Richardson et al. |
| 9,787,775 B1 | 10/2017 | Richardson et al. |
| 9,794,216 B2 | 10/2017 | Richardson et al. |
| 9,794,281 B1 | 10/2017 | Radlein et al. |
| 9,800,539 B2 | 10/2017 | Richardson et al. |
| 9,811,451 B1 | 11/2017 | Arguelles et al. |
| 9,819,567 B1 | 11/2017 | Uppal et al. |
| 9,832,141 B1 | 11/2017 | Raftery |
| 9,871,794 B2 | 1/2018 | Joffe et al. |
| 9,887,914 B2 | 2/2018 | Bergman |
| 9,887,915 B2 | 2/2018 | Richardson et al. |
| 9,887,931 B1 | 2/2018 | Uppal et al. |
| 9,887,932 B1 | 2/2018 | Uppal et al. |
| 9,888,089 B2 | 2/2018 | Sivasubramanian et al. |
| 9,893,957 B2 | 2/2018 | Ellsworth et al. |
| 9,894,168 B2 | 2/2018 | Sivasubramanian et al. |
| 9,900,402 B1 | 2/2018 | Li et al. |
| 9,912,740 B2 | 3/2018 | Richardson et al. |
| 9,929,959 B2 | 3/2018 | Mostert |
| 9,930,131 B2 | 3/2018 | MacCarthaigh et al. |
| 9,954,934 B2 | 4/2018 | Sivasubramanian et al. |
| 9,985,927 B2 | 5/2018 | Richardson et al. |
| 9,992,086 B1 | 6/2018 | Mizik et al. |
| 9,992,303 B2 | 6/2018 | Richardson et al. |
| 10,015,237 B2 | 7/2018 | Richardson et al. |
| 10,015,241 B2 | 7/2018 | Marr et al. |
| 10,021,179 B1 | 7/2018 | Velummylum et al. |
| 10,027,582 B2 | 7/2018 | Richardson et al. |
| 10,033,627 B1 | 7/2018 | Howard et al. |
| 10,033,691 B1 | 7/2018 | Mizik et al. |
| 10,049,051 B1 | 8/2018 | Baldwin |
| 10,075,551 B1 | 9/2018 | Baldwin et al. |
| 10,079,742 B1 | 9/2018 | Richardson et al. |
| 10,091,096 B1 | 10/2018 | Howard et al. |
| 10,097,398 B1 | 10/2018 | Richardson et al. |
| 10,097,448 B1 | 10/2018 | Howard et al. |
| 10,097,566 B1 | 10/2018 | Radlein et al. |
| 10,110,694 B1 | 10/2018 | Watson et al. |
| 10,116,584 B2 | 10/2018 | Richardson et al. |
| 10,135,620 B2 | 11/2018 | Richardson et al. |
| 10,157,135 B2 | 12/2018 | Richardson et al. |
| 10,158,729 B2 | 12/2018 | Sivasubramanian et al. |
| 10,162,753 B2 | 12/2018 | Marshall et al. |
| 10,180,993 B2 | 1/2019 | Raftery |
| 2001/0000811 A1 | 5/2001 | May et al. |
| 2001/0025305 A1 | 9/2001 | Yoshiasa et al. |
| 2001/0027479 A1 | 10/2001 | Delaney et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010783 A1 | 1/2002 | Primak et al. |
| 2002/0010798 A1 | 1/2002 | Ben-Shaul et al. |
| 2002/0035624 A1 | 3/2002 | Jun-Hyeong |
| 2002/0048269 A1 | 4/2002 | Hong et al. |
| 2002/0049608 A1 | 4/2002 | Hartsell et al. |
| 2002/0049842 A1 | 4/2002 | Huetsch et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0065910 A1 | 5/2002 | Dutta |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083178 A1 | 6/2002 | Brothers |
| 2002/0083198 A1 | 6/2002 | Kim et al. |
| 2002/0087374 A1 | 7/2002 | Boubez et al. |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |
| 2002/0107944 A1 | 8/2002 | Bai et al. |
| 2002/0112049 A1 | 8/2002 | Elnozahy et al. |
| 2002/0112123 A1 | 8/2002 | Becker et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0133741 A1 | 9/2002 | Maeda et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0138649 A1 | 9/2002 | Cartmell et al. |
| 2002/0143675 A1 | 10/2002 | Orshan |
| 2002/0143798 A1 | 10/2002 | Lisiecki et al. |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |

(56) References Cited

U.S. PATENT DOCUMENTS

| | | |
|---|---|---|
| 2002/0184368 A1 | 12/2002 | Wang |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0004998 A1 | 1/2003 | Datta |
| 2003/0005036 A1 | 1/2003 | Mitzenmacher |
| 2003/0005111 A1 | 1/2003 | Allan |
| 2003/0007482 A1 | 1/2003 | Khello et al. |
| 2003/0009488 A1 | 1/2003 | Hart, III |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0037284 A1 | 2/2003 | Srinivasan et al. |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0070096 A1* | 4/2003 | Pazi ............... H04L 29/12066 726/4 |
| 2003/0074401 A1 | 4/2003 | Connell et al. |
| 2003/0074471 A1 | 4/2003 | Anderson et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0105829 A1 | 6/2003 | Hayward |
| 2003/0105857 A1 | 6/2003 | Kamen et al. |
| 2003/0112792 A1 | 6/2003 | Cranor et al. |
| 2003/0120741 A1 | 6/2003 | Wu et al. |
| 2003/0126387 A1 | 7/2003 | Watanabe |
| 2003/0133554 A1 | 7/2003 | Nykanen et al. |
| 2003/0135467 A1 | 7/2003 | Okamoto |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0177321 A1 | 9/2003 | Watanabe |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0206520 A1 | 11/2003 | Wu et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2004/0003032 A1 | 1/2004 | Ma et al. |
| 2004/0010562 A1 | 1/2004 | Itonaga |
| 2004/0010563 A1 | 1/2004 | Forte et al. |
| 2004/0010588 A1 | 1/2004 | Slater et al. |
| 2004/0010601 A1 | 1/2004 | Afergan |
| 2004/0010621 A1 | 1/2004 | Afergan et al. |
| 2004/0015584 A1 | 1/2004 | Cartmell et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0032278 A1 | 2/2004 | Orii et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0054757 A1 | 3/2004 | Ueda et al. |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0068542 A1 | 4/2004 | Lalonde et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0105544 A1 | 6/2004 | Haneda et al. |
| 2004/0117309 A1 | 6/2004 | Inoue et al. |
| 2004/0117455 A1 | 6/2004 | Kaminksy et al. |
| 2004/0128344 A1 | 7/2004 | Trossen |
| 2004/0128346 A1 | 7/2004 | Melamed et al. |
| 2004/0148520 A1 | 7/2004 | Talpade et al. |
| 2004/0167981 A1 | 8/2004 | Douglas et al. |
| 2004/0167982 A1 | 8/2004 | Cohen et al. |
| 2004/0170379 A1 | 9/2004 | Yao et al. |
| 2004/0172466 A1 | 9/2004 | Douglas et al. |
| 2004/0184456 A1* | 9/2004 | Binding ............ H04L 29/12009 370/392 |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0246948 A1 | 12/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0015471 A1 | 1/2005 | Zhang et al. |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0039019 A1 | 2/2005 | Delany |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0147088 A1 | 7/2005 | Bao et al. |
| 2005/0149529 A1 | 7/2005 | Gutmans |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0172080 A1 | 8/2005 | Miyauchi |
| 2005/0181769 A1 | 8/2005 | Kogawa |
| 2005/0188073 A1 | 8/2005 | Nakamichi et al. |
| 2005/0192008 A1 | 9/2005 | Desai et al. |
| 2005/0198170 A1 | 9/2005 | LeMay et al. |
| 2005/0198200 A1 | 9/2005 | Subramanian et al. |
| 2005/0198303 A1 | 9/2005 | Knauerhase et al. |
| 2005/0198334 A1 | 9/2005 | Farber et al. |
| 2005/0198453 A1 | 9/2005 | Osaki |
| 2005/0198571 A1 | 9/2005 | Kramer et al. |
| 2005/0216483 A1 | 9/2005 | Armstrong et al. |

(56) References Cited

U.S. PATENT DOCUMENTS

| | | |
|---|---|---|
| 2005/0216569 A1 | 9/2005 | Coppola et al. |
| 2005/0216674 A1 | 9/2005 | Robbin et al. |
| 2005/0223095 A1 | 10/2005 | Volz et al. |
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0240574 A1 | 10/2005 | Challenger et al. |
| 2005/0256880 A1 | 11/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0266835 A1 | 12/2005 | Agrawal et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0005014 A1 | 1/2006 | Aura et al. |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0021001 A1 | 1/2006 | Giles et al. |
| 2006/0026067 A1 | 2/2006 | Nicholas et al. |
| 2006/0026154 A1 | 2/2006 | Altinel et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0045005 A1 | 3/2006 | Blackmore et al. |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0070060 A1 | 3/2006 | Tantawi et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0106938 A1 | 5/2006 | Dini et al. |
| 2006/0107036 A1 | 5/2006 | Randle et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0129766 A1 | 6/2006 | Cassia et al. |
| 2006/0136453 A1 | 6/2006 | Kwan |
| 2006/0143293 A1 | 6/2006 | Freedman |
| 2006/0143442 A1 | 6/2006 | Smith |
| 2006/0146820 A1 | 7/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0173957 A1 | 8/2006 | Robinson |
| 2006/0179080 A1 | 8/2006 | Meek et al. |
| 2006/0184936 A1 | 8/2006 | Abels et al. |
| 2006/0188097 A1 | 8/2006 | Taniguchi et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0288119 A1 | 12/2006 | Kim et al. |
| 2006/0288424 A1 | 12/2006 | Saito |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043667 A1 | 2/2007 | Qawami et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0061440 A1 | 3/2007 | Sundaram et al. |
| 2007/0064610 A1 | 3/2007 | Khandani |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101061 A1 | 5/2007 | Baskaran et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0156726 A1 | 7/2007 | Levy |
| 2007/0156919 A1 | 7/2007 | Potti et al. |
| 2007/0162331 A1 | 7/2007 | Sullivan |
| 2007/0168336 A1 | 7/2007 | Ransil et al. |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0243860 A1 | 10/2007 | Aiello et al. |
| 2007/0244964 A1 | 10/2007 | Challenger et al. |
| 2007/0245022 A1 | 10/2007 | Olliphant et al. |
| 2007/0250467 A1 | 10/2007 | Mesnik et al. |
| 2007/0250468 A1 | 10/2007 | Pieper |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |

(56) References Cited

U.S. PATENT DOCUMENTS

| | | |
|---|---|---|
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280229 A1 | 12/2007 | Kenney |
| 2007/0288588 A1 | 12/2007 | Wein et al. |
| 2007/0291739 A1 | 12/2007 | Sullivan et al. |
| 2007/0294419 A1 | 12/2007 | Ulevitch |
| 2008/0005057 A1 | 1/2008 | Ozzie et al. |
| 2008/0008089 A1 | 1/2008 | Bornstein et al. |
| 2008/0016233 A1 | 1/2008 | Schneider |
| 2008/0025304 A1 | 1/2008 | Venkataswami et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0049615 A1 | 2/2008 | Bugenhagen |
| 2008/0056207 A1 | 3/2008 | Eriksson et al. |
| 2008/0065724 A1 | 3/2008 | Seed et al. |
| 2008/0065745 A1 | 3/2008 | Leighton et al. |
| 2008/0066072 A1 | 3/2008 | Yurekli et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0101358 A1 | 5/2008 | Van Ewijk et al. |
| 2008/0103805 A1 | 5/2008 | Shear et al. |
| 2008/0104268 A1 | 5/2008 | Farber et al. |
| 2008/0109679 A1 | 5/2008 | Wright et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0222647 A1 | 9/2008 | Taylor et al. |
| 2008/0228574 A1 | 9/2008 | Stewart et al. |
| 2008/0228920 A1 | 9/2008 | Souders et al. |
| 2008/0235383 A1 | 9/2008 | Schneider |
| 2008/0235400 A1 | 9/2008 | Slocombe et al. |
| 2008/0256087 A1 | 10/2008 | Piironen et al. |
| 2008/0256175 A1 | 10/2008 | Lee et al. |
| 2008/0263135 A1 | 10/2008 | Olliphant |
| 2008/0270882 A1 | 10/2008 | Rollins et al. |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0043900 A1 | 2/2009 | Barber |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0083279 A1 | 3/2009 | Hasek |
| 2009/0086728 A1 | 4/2009 | Gulati et al. |
| 2009/0086741 A1 | 4/2009 | Zhang |
| 2009/0089869 A1 | 4/2009 | Varghese |
| 2009/0094252 A1 | 4/2009 | Wong et al. |
| 2009/0103707 A1 | 4/2009 | McGary et al. |
| 2009/0106202 A1 | 4/2009 | Mizrahi |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132640 A1 | 5/2009 | Verma et al. |
| 2009/0132648 A1 | 5/2009 | Swildens et al. |
| 2009/0138533 A1 | 5/2009 | Iwasaki et al. |
| 2009/0138582 A1 | 5/2009 | Turk |
| 2009/0144411 A1 | 6/2009 | Winkler et al. |
| 2009/0144412 A1 | 6/2009 | Ferguson et al. |
| 2009/0150926 A1 | 6/2009 | Schlack |
| 2009/0157504 A1 | 6/2009 | Braemer et al. |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 8/2009 | Sundaram et al. |
| 2009/0204682 A1 | 8/2009 | Jeyaseelan et al. |
| 2009/0210549 A1 | 8/2009 | Hudson et al. |
| 2009/0228708 A1 | 9/2009 | Trostle |
| 2009/0233623 A1 | 9/2009 | Johnson |
| 2009/0241167 A1 | 9/2009 | Moore |
| 2009/0248697 A1 | 10/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0259588 A1 | 10/2009 | Lindsay |
| 2009/0259971 A1 | 10/2009 | Rankine et al. |
| 2009/0262741 A1 | 10/2009 | Jungck et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1 | 11/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307286 A1 | 12/2009 | Laffin |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0020699 A1 | 1/2010 | On |

(56) References Cited

U.S. PATENT DOCUMENTS

| | | |
|---|---|---|
| 2010/0023601 A1 | 1/2010 | Lewin et al. |
| 2010/0023621 A1 | 1/2010 | Ezolt et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |
| 2010/0049862 A1 | 2/2010 | Dixon |
| 2010/0057894 A1 | 3/2010 | Glasser |
| 2010/0070603 A1 | 3/2010 | Moss et al. |
| 2010/0070700 A1 | 3/2010 | Borst et al. |
| 2010/0082320 A1 | 4/2010 | Wood et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0103837 A1 | 4/2010 | Jungck et al. |
| 2010/0106934 A1 | 4/2010 | Calder et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161564 A1 | 6/2010 | Lee et al. |
| 2010/0161565 A1 | 6/2010 | Lee et al. |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0174811 A1 | 7/2010 | Musiri et al. |
| 2010/0191854 A1 | 7/2010 | Isci et al. |
| 2010/0192225 A1 | 7/2010 | Ma et al. |
| 2010/0217801 A1 | 8/2010 | Leighton et al. |
| 2010/0217856 A1 | 8/2010 | Falkena |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0325365 A1 | 12/2010 | Colglazier et al. |
| 2010/0332595 A1 | 12/2010 | Fullagar et al. |
| 2011/0010244 A1 | 1/2011 | Hatridge |
| 2011/0016214 A1 | 1/2011 | Jackson |
| 2011/0029598 A1 | 2/2011 | Arnold et al. |
| 2011/0040893 A1 | 2/2011 | Karaoguz et al. |
| 2011/0051738 A1 | 3/2011 | Xu |
| 2011/0055386 A1 | 3/2011 | Middleton et al. |
| 2011/0055714 A1 | 3/2011 | Vemulapalli et al. |
| 2011/0055921 A1 | 3/2011 | Narayanaswamy et al. |
| 2011/0057790 A1 | 3/2011 | Martin et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0085654 A1 | 4/2011 | Jana et al. |
| 2011/0087769 A1 | 4/2011 | Holmes et al. |
| 2011/0096987 A1 | 4/2011 | Morales et al. |
| 2011/0106949 A1 | 5/2011 | Patel et al. |
| 2011/0113467 A1 | 5/2011 | Agarwal et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0154350 A1 | 6/2011 | Doyle et al. |
| 2011/0161461 A1 | 6/2011 | Niven-Jenkins |
| 2011/0166935 A1 | 7/2011 | Armentrout et al. |
| 2011/0182290 A1 | 7/2011 | Perkins |
| 2011/0191445 A1 | 8/2011 | Dazzi |
| 2011/0191447 A1 | 8/2011 | Dazzi et al. |
| 2011/0191449 A1 | 8/2011 | Swildens et al. |
| 2011/0191459 A1 | 8/2011 | Joshi |
| 2011/0196892 A1 | 8/2011 | Xia |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 9/2011 | Farber et al. |
| 2011/0219372 A1 | 9/2011 | Agarwal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |
| 2011/0296053 A1 | 12/2011 | Medved et al. |
| 2011/0296370 A1 | 12/2011 | Ferris et al. |
| 2011/0302304 A1 | 12/2011 | Baumback et al. |
| 2011/0307533 A1 | 12/2011 | Saeki |
| 2011/0320522 A1 | 12/2011 | Endres et al. |
| 2011/0320559 A1 | 12/2011 | Foti |
| 2012/0011190 A1 | 1/2012 | Driesen et al. |
| 2012/0023090 A1 | 1/2012 | Holloway et al. |
| 2012/0023226 A1 | 1/2012 | Petersen et al. |
| 2012/0036238 A1 | 2/2012 | Sundaram et al. |
| 2012/0041970 A1 | 2/2012 | Ghosh et al. |
| 2012/0066360 A1 | 3/2012 | Ghosh |
| 2012/0072600 A1 | 3/2012 | Richardson et al. |
| 2012/0072608 A1 | 3/2012 | Peters et al. |
| 2012/0078998 A1 | 3/2012 | Son et al. |
| 2012/0079096 A1 | 3/2012 | Cowan et al. |
| 2012/0079115 A1 | 3/2012 | Richardson et al. |
| 2012/0089700 A1 | 4/2012 | Safruti et al. |
| 2012/0089972 A1 | 4/2012 | Scheidel et al. |
| 2012/0096065 A1 | 4/2012 | Suit et al. |
| 2012/0096166 A1 | 4/2012 | Devarapalli et al. |
| 2012/0110515 A1 | 5/2012 | Abramoff et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0142310 A1 | 6/2012 | Pugh et al. |
| 2012/0143688 A1 | 6/2012 | Alexander |
| 2012/0159476 A1 | 6/2012 | Ramteke et al. |
| 2012/0166516 A1 | 6/2012 | Simmons et al. |
| 2012/0169646 A1 | 7/2012 | Berkes et al. |
| 2012/0173677 A1 | 7/2012 | Richardson et al. |
| 2012/0173760 A1 | 7/2012 | Jog et al. |
| 2012/0179796 A1 | 7/2012 | Nagaraj et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0198071 A1 | 8/2012 | Black et al. |
| 2012/0209942 A1 | 8/2012 | Zehavi et al. |
| 2012/0224516 A1 | 9/2012 | Stojanovski et al. |
| 2012/0226649 A1 | 9/2012 | Kovacs et al. |
| 2012/0233329 A1 | 9/2012 | Dickinson et al. |
| 2012/0233522 A1 | 9/2012 | Barton et al. |
| 2012/0233668 A1 | 9/2012 | Leafe et al. |
| 2012/0239725 A1 | 9/2012 | Hartrick et al. |
| 2012/0246129 A1 | 9/2012 | Rothschild et al. |
| 2012/0246257 A1 | 9/2012 | Brown |
| 2012/0254961 A1 | 10/2012 | Kim et al. |
| 2012/0257628 A1 | 10/2012 | Bu et al. |

(56) References Cited

U.S. PATENT DOCUMENTS

| | | |
|---|---|---|
| 2012/0259954 A1 | 10/2012 | McCarthy et al. |
| 2012/0278229 A1 | 11/2012 | Vishwanathan et al. |
| 2012/0278831 A1 | 11/2012 | van Coppenolle et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0324089 A1 | 12/2012 | Joshi |
| 2013/0003547 A1 | 1/2013 | Motwani et al. |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0007273 A1 | 1/2013 | Baumback et al. |
| 2013/0018945 A1 | 1/2013 | Vendrow et al. |
| 2013/0019311 A1 | 1/2013 | Swildens et al. |
| 2013/0034099 A1 | 2/2013 | Hikichi et al. |
| 2013/0041872 A1 | 2/2013 | Aizman et al. |
| 2013/0046869 A1 | 2/2013 | Jenkins et al. |
| 2013/0046883 A1 | 2/2013 | Lientz et al. |
| 2013/0054675 A1 | 2/2013 | Jenkins et al. |
| 2013/0055374 A1 | 2/2013 | Kustarz et al. |
| 2013/0067530 A1 | 3/2013 | Spektor et al. |
| 2013/0073808 A1 | 3/2013 | Puthalath et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0080623 A1 | 3/2013 | Thireault |
| 2013/0080627 A1 | 3/2013 | Kukreja et al. |
| 2013/0080636 A1 | 3/2013 | Friedman et al. |
| 2013/0086001 A1 | 4/2013 | Bhogal et al. |
| 2013/0111035 A1 | 5/2013 | Alapati et al. |
| 2013/0117282 A1 | 5/2013 | Mugali, Jr. et al. |
| 2013/0117849 A1 | 5/2013 | Golshan et al. |
| 2013/0130221 A1 | 5/2013 | Kortemeyer et al. |
| 2013/0133057 A1 | 5/2013 | Yoon et al. |
| 2013/0151646 A1 | 6/2013 | Chidambaram et al. |
| 2013/0191499 A1 | 7/2013 | Ludin et al. |
| 2013/0198341 A1 | 8/2013 | Kim |
| 2013/0212300 A1 | 8/2013 | Eggleston et al. |
| 2013/0219020 A1 | 8/2013 | McCarthy et al. |
| 2013/0227165 A1 | 8/2013 | Liu |
| 2013/0246567 A1 | 9/2013 | Green et al. |
| 2013/0254269 A1 | 9/2013 | Sivasubramanian et al. |
| 2013/0254879 A1 | 9/2013 | Chesla et al. |
| 2013/0263256 A1 | 10/2013 | Dickinson et al. |
| 2013/0268616 A1 | 10/2013 | Sakata et al. |
| 2013/0275549 A1 | 10/2013 | Field et al. |
| 2013/0279335 A1 | 10/2013 | Ahmadi |
| 2013/0305046 A1 | 11/2013 | Mankovski et al. |
| 2013/0311583 A1 | 11/2013 | Humphreys et al. |
| 2013/0311605 A1 | 11/2013 | Richardson et al. |
| 2013/0311989 A1 | 11/2013 | Ota et al. |
| 2013/0318153 A1 | 11/2013 | Sivasubramanian et al. |
| 2013/0339429 A1 | 12/2013 | Richardson et al. |
| 2013/0346465 A1 | 12/2013 | Maltz et al. |
| 2013/0346470 A1 | 12/2013 | Obstfeld et al. |
| 2013/0346567 A1 | 12/2013 | Richardson et al. |
| 2013/0346614 A1 | 12/2013 | Baughman et al. |
| 2014/0006577 A1 | 1/2014 | Joe et al. |
| 2014/0007239 A1 | 1/2014 | Sharpe et al. |
| 2014/0013403 A1 | 1/2014 | Shuster |
| 2014/0019605 A1 | 1/2014 | Boberg |
| 2014/0022951 A1 | 1/2014 | Lemieux |
| 2014/0036675 A1 | 2/2014 | Wang et al. |
| 2014/0040478 A1 | 2/2014 | Hsu et al. |
| 2014/0047104 A1 | 2/2014 | Rodriguez |
| 2014/0053022 A1 | 2/2014 | Forgette et al. |
| 2014/0059120 A1 | 2/2014 | Richardson et al. |
| 2014/0059198 A1 | 2/2014 | Richardson et al. |
| 2014/0059379 A1 | 2/2014 | Ren et al. |
| 2014/0082165 A1 | 3/2014 | Marr et al. |
| 2014/0082614 A1 | 3/2014 | Klein et al. |
| 2014/0089917 A1 | 3/2014 | Attalla et al. |
| 2014/0108672 A1 | 4/2014 | Ou et al. |
| 2014/0122698 A1 | 5/2014 | Batrouni et al. |
| 2014/0122725 A1 | 5/2014 | Batrouni et al. |
| 2014/0137111 A1 | 5/2014 | Dees et al. |
| 2014/0143320 A1 | 5/2014 | Sivasubramanian et al. |
| 2014/0149601 A1* | 5/2014 | Carney ............... H04L 67/1097 709/238 |
| 2014/0164817 A1 | 6/2014 | Bartholomy et al. |
| 2014/0165061 A1 | 6/2014 | Greene et al. |
| 2014/0195686 A1 | 7/2014 | Yeager et al. |
| 2014/0215019 A1 | 7/2014 | Ahrens |
| 2014/0244937 A1 | 8/2014 | Bloomstein et al. |
| 2014/0257891 A1 | 9/2014 | Richardson et al. |
| 2014/0269371 A1 | 9/2014 | Badea et al. |
| 2014/0280606 A1 | 9/2014 | Long |
| 2014/0280679 A1 | 9/2014 | Dey et al. |
| 2014/0297866 A1 | 10/2014 | Ennaji et al. |
| 2014/0297870 A1 | 10/2014 | Eggleston et al. |
| 2014/0310402 A1 | 10/2014 | Giaretta et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0351871 A1 | 11/2014 | Bomfim et al. |
| 2014/0365666 A1 | 12/2014 | Richardson et al. |
| 2015/0006615 A1 | 1/2015 | Wainner et al. |
| 2015/0019686 A1 | 1/2015 | Backholm |
| 2015/0026407 A1 | 1/2015 | Mclellan et al. |
| 2015/0067171 A1 | 3/2015 | Yum |
| 2015/0074228 A1 | 3/2015 | Drake |
| 2015/0081842 A1 | 3/2015 | Richardson et al. |
| 2015/0081877 A1 | 3/2015 | Sethi et al. |
| 2015/0088964 A1 | 3/2015 | Shiell et al. |
| 2015/0088972 A1 | 3/2015 | Brand et al. |
| 2015/0089621 A1 | 3/2015 | Khalid |
| 2015/0106864 A1 | 4/2015 | Li et al. |
| 2015/0154051 A1 | 6/2015 | Kruglick |
| 2015/0156279 A1 | 6/2015 | Vaswani et al. |
| 2015/0172379 A1 | 6/2015 | Richardson et al. |
| 2015/0172407 A1 | 6/2015 | MacCarthaigh et al. |
| 2015/0172414 A1 | 6/2015 | Richardson et al. |
| 2015/0172415 A1 | 6/2015 | Richardson et al. |
| 2015/0180988 A1 | 6/2015 | Sivasubramanian et al. |
| 2015/0188734 A1 | 7/2015 | Petrov |
| 2015/0188994 A1 | 7/2015 | Marshall et al. |
| 2015/0189042 A1 | 7/2015 | Sun et al. |
| 2015/0195244 A1 | 7/2015 | Richardson et al. |
| 2015/0200991 A1 | 7/2015 | Kwon |
| 2015/0207733 A1 | 7/2015 | Richardson et al. |
| 2015/0215270 A1 | 7/2015 | Sivasubramanian et al. |
| 2015/0215656 A1 | 7/2015 | Pulung et al. |
| 2015/0229710 A1 | 8/2015 | Sivasubramanian et al. |
| 2015/0244580 A1 | 8/2015 | Saavedra |
| 2015/0256647 A1 | 9/2015 | Richardson et al. |
| 2015/0288647 A1 | 10/2015 | Chhabra et al. |
| 2015/0319194 A1 | 11/2015 | Richardson et al. |
| 2015/0319260 A1 | 11/2015 | Watson |
| 2015/0334082 A1 | 11/2015 | Richardson et al. |
| 2015/0341431 A1 | 11/2015 | Hartrick et al. |
| 2015/0358276 A1 | 12/2015 | Liu et al. |
| 2015/0358436 A1 | 12/2015 | Kim et al. |
| 2015/0363113 A1 | 12/2015 | Rahman et al. |
| 2016/0006672 A1 | 1/2016 | Saavedra |
| 2016/0021197 A1 | 1/2016 | Pogrebinsky et al. |
| 2016/0026568 A1 | 1/2016 | Marshall et al. |
| 2016/0028598 A1 | 1/2016 | Khakpour et al. |
| 2016/0028644 A1 | 1/2016 | Richardson et al. |
| 2016/0028755 A1 | 1/2016 | Vasseur et al. |
| 2016/0036857 A1 | 2/2016 | Foxhoven et al. |
| 2016/0041910 A1 | 2/2016 | Richardson et al. |
| 2016/0065665 A1 | 3/2016 | Richardson et al. |
| 2016/0072669 A1* | 3/2016 | Saavedra ............ H04L 12/2867 709/220 |
| 2016/0072720 A1 | 3/2016 | Richardson et al. |
| 2016/0132600 A1 | 5/2016 | Woodhead et al. |
| 2016/0134492 A1 | 5/2016 | Ellsworth et al. |
| 2016/0142251 A1 | 5/2016 | Contreras et al. |
| 2016/0142367 A1 | 5/2016 | Richardson et al. |
| 2016/0182454 A1 | 6/2016 | Phonsa et al. |

(56) References Cited

U.S. PATENT DOCUMENTS

| | | |
|---|---|---|
| 2016/0182542 A1 | 6/2016 | Staniford |
| 2016/0205062 A1 | 7/2016 | Mosert |
| 2016/0241637 A1 | 8/2016 | Marr et al. |
| 2016/0241639 A1 | 8/2016 | Brookins et al. |
| 2016/0241651 A1 | 8/2016 | Sivasubramanian et al. |
| 2016/0253262 A1 | 9/2016 | Nadgowda |
| 2016/0255042 A1 | 9/2016 | Newton |
| 2016/0274929 A1 | 9/2016 | King |
| 2016/0294678 A1* | 10/2016 | Khakpour ............... H04L 45/22 |
| 2016/0308959 A1 | 10/2016 | Richardson et al. |
| 2016/0337426 A1 | 11/2016 | Shribman et al. |
| 2016/0366202 A1 | 12/2016 | Phillips et al. |
| 2017/0041428 A1 | 2/2017 | Katsev |
| 2017/0085495 A1 | 3/2017 | Richardson et al. |
| 2017/0099345 A1 | 4/2017 | Leach |
| 2017/0109316 A1 | 4/2017 | Hack et al. |
| 2017/0126557 A1 | 5/2017 | Richardson et al. |
| 2017/0126796 A1 | 5/2017 | Hollis et al. |
| 2017/0142062 A1 | 5/2017 | Richardson et al. |
| 2017/0153980 A1 | 6/2017 | Araújo et al. |
| 2017/0155678 A1 | 6/2017 | Araújo et al. |
| 2017/0155732 A1 | 6/2017 | Araújo et al. |
| 2017/0171146 A1 | 6/2017 | Sharma et al. |
| 2017/0180217 A1 | 6/2017 | Puchala et al. |
| 2017/0214755 A1 | 7/2017 | Sivasubramanian et al. |
| 2017/0214761 A1 | 7/2017 | Hsu et al. |
| 2017/0250821 A1 | 8/2017 | Richardson et al. |
| 2017/0257340 A1 | 9/2017 | Richardson et al. |
| 2017/0353395 A1 | 12/2017 | Richardson et al. |
| 2018/0063027 A1 | 3/2018 | Rafferty |
| 2018/0077109 A1 | 3/2018 | Hoeme et al. |
| 2018/0077110 A1 | 3/2018 | Huston, III et al. |
| 2018/0097631 A1 | 4/2018 | Uppal et al. |
| 2018/0097634 A1 | 4/2018 | Uppal et al. |
| 2018/0097831 A1 | 4/2018 | Uppal et al. |
| 2018/0109553 A1 | 4/2018 | Radlein et al. |
| 2018/0159757 A1 | 6/2018 | Uppal et al. |
| 2018/0159769 A1 | 6/2018 | Richardson et al. |
| 2018/0167444 A1 | 6/2018 | Sivasubramanian et al. |
| 2018/0167469 A1 | 6/2018 | Sivasubramanian et al. |
| 2018/0183689 A1 | 6/2018 | Ellsworth et al. |
| 2018/0191817 A1 | 7/2018 | Richardson et al. |
| 2018/0212880 A1 | 7/2018 | Mostert |
| 2018/0213052 A1 | 7/2018 | Maccarthaigh et al. |
| 2018/0278717 A1 | 9/2018 | Richardson et al. |
| 2018/0287916 A1 | 10/2018 | Mizik et al. |
| 2018/0302322 A1 | 10/2018 | Richardson et al. |
| 2018/0332107 A1 | 11/2018 | Marr et al. |
| 2018/0351904 A1 | 12/2018 | Mizik et al. |
| 2018/0367498 A1 | 12/2018 | Bliss et al. |
| 2019/0007515 A1 | 1/2019 | Baldwin et al. |
| 2019/0044787 A1 | 2/2019 | Richardson et al. |

FOREIGN PATENT DOCUMENTS

| | | |
|---|---|---|
| CN | 1511399 A | 7/2004 |
| CN | 1605182 A | 4/2005 |
| CN | 101189598 A | 5/2008 |
| CN | 101460907 A | 6/2009 |
| CN | 103731481 A | 4/2014 |
| EP | 1603307 A2 | 12/2005 |
| EP | 1351141 A2 | 10/2007 |
| EP | 2008167 A2 | 12/2008 |
| EP | 3156911 A1 | 4/2017 |
| JP | 07-141305 | 6/1995 |
| JP | 2001-0506093 | 5/2001 |
| JP | 2001-249907 | 9/2001 |
| JP | 2002-024192 | 1/2002 |
| JP | 2002-044137 | 2/2002 |
| JP | 2002-323986 | 11/2002 |
| JP | 2003-167810 A | 6/2003 |
| JP | 2003-167813 A | 6/2003 |
| JP | 2003-522358 A | 7/2003 |
| JP | 2003188901 A | 7/2003 |
| JP | 2004-070935 | 3/2004 |
| JP | 2004-532471 | 10/2004 |
| JP | 2004-533738 A | 11/2004 |
| JP | 2005-537687 | 12/2005 |
| JP | 2007-133896 A | 5/2007 |
| JP | 2007-207225 A | 8/2007 |
| JP | 2008-515106 | 5/2008 |
| JP | 2009-071538 A | 4/2009 |
| JP | 2012-509623 | 4/2012 |
| JP | 2012-209623 | 10/2012 |
| WO | WO 2002/069608 A2 | 9/2002 |
| WO | WO 2005/071560 A1 | 8/2005 |
| WO | WO 2007/007960 A1 | 1/2007 |
| WO | WO 2007/126837 A2 | 11/2007 |
| WO | WO 2009124006 A2 | 10/2009 |
| WO | WO 2010/002603 A1 | 1/2010 |
| WO | WO 2012/044587 | 4/2012 |
| WO | WO 2012065641 A1 | 5/2012 |
| WO | WO 2014/047073 A1 | 3/2014 |
| WO | WO 2017/106455 A1 | 6/2017 |

OTHER PUBLICATIONS

"Final Office Action dated Sep. 5, 2012," U.S. Appl. No. 12/652,541, filed Sep. 5, 2012; 40 pages.
"Notice of Allowance dated Jan. 4, 2013," U.S. Appl. No. 12/652,541, filed Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdeliverynetwork&oldid=601009970, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONG-MAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3 .xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.

(56) References Cited

OTHER PUBLICATIONS

Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Armour et al.: "A Heuristic Algorithm and Simulation Approach to Relative Location of Facilities"; Management Science, vol. 9, No. 2 (Jan. 1963); pp. 294-309.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls," ;login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes",May 2005, In Proc. of Networking 2005, all pages.
Gunther et al, "Measuring Round Trip Times to determine the Distance between WLAN Nodes", Dec. 18, 2004, Technical University Berlin, all pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Horvath et al., "Enhancing Energy Efficiency in Multi-tier Web Server Clusters via Prioritization," in Parallel and Distributed Processing Symposium, 2007. IPDPS 2007. IEEE International , vol., No., pp. 1-6, Mar. 26-30, 2007.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Kenshi, P., "Help File Library: Iptables Basics," Justlinux, retrieved Dec. 1, 2005, from http://www.justlinux.com/nhf/Security/Iptables _Basics.html, 4 pages.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Sharif et al, "Secure In-VM Monitoring Using Hardware Virtualization", Microsoft, Oct. 2009 http://research.microsoft.com/pubs/153179/sim-ccs09.pdf; 11 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.

(56) References Cited

OTHER PUBLICATIONS

Zhu, Xiaoyun, et al., "Utility-Driven Workload Management Using Nested Control Design," Mar. 29, 2006, HP Laboratories Palo Alto, HPL-2005-193(R. 1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, dated Oct. 12, 2011 in 11 pages.
Supplementary European Search Report in Application No. 09727694.3 dated Jan. 30, 2012 in 6 pages.
Singapore Examination Report in Application No. 201006837-7 dated Mar. 16, 2012.
First Office Action in Chinese Application No. 200980111426.1 dated Feb. 16, 2013.
Second Office Action in Chinese Application No. 200980111426.1 dated Dec. 25, 2013.
Third Office Action in Chinese Application No. 200980111426.1 dated Jul. 7, 2014.
Fourth Office Action in Chinese Application No. 200980111426.1 dated Jan. 15, 2015.
Fifth Office Action in Chinese Application No. 200980111426.1 dated Aug. 14, 2015.
First Office Action in Japanese Application No. 2011-502139 dated Nov. 5, 2013.
Decision of Rejection in Application No. 2011-502139 dated Jun. 30, 2014.
Singapore Written Opinion in Application No. 201006874-0, dated Oct. 12, 2011 in 10 pages.
First Office Action in Japanese Application No. 2011-502140 dated Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report for European Application No. 09839809.2 dated May 11, 2015.
Supplementary European Search Report in Application No. 09728756.9 dated Jan. 8, 2013.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
First Office Action in Japanese Application No. 2011-503091 dated Nov. 18, 2013.
Office Action in Japanese Application No. 2014-225580 dated Oct. 26, 2015.
Search Report and Written Opinion issued in Singapore Application No. 201006873-2 dated Oct. 12, 2011.
First Office Action is Chinese Application No. 200980125551.8 dated Jul. 4, 2012.
First Office Action in Japanese Application No. 2011-516466 dated Mar. 6, 2013.
Second Office Action in Japanese Application No. 2011-516466 dated Mar. 17, 2014.
Decision of Refusal in Japanese Application No. 2011-516466 dated Jan. 16, 2015.
Office Action in Canadian Application No. 2726915 dated May 13, 2013.
First Office Action in Korean Application No. 10-2011-7002461 dated May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Search Report and Written Opinion in Singapore Application No. 201103333-9 dated Nov. 19, 2012.
Examination Report in Singapore Application No. 201103333-9 dated Aug. 13, 2013.
International Search Report and Written Opinion in PCT/US2011/053302 dated Nov. 28, 2011 in 11 pages.
International Preliminary Report on Patentability in PCT/US2011/053302 dated Apr. 2, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Second Office Action in Chinese Application No. 201180046104.0 dated Sep. 29, 2015.
Examination Report in Singapore Application No. 201301573-0 dated Dec. 22, 2014.
International Preliminary Report on Patentability in PCT/US2011/061486 dated May 22, 2013.
International Search Report and Written Opinion in PCT/US2011/061486 dated Mar. 30, 2012 in 11 pages.
Office Action in Canadian Application No. 2816612 dated Nov. 3, 2015.
First Office Action in Chinese Application No. 201180053405.6 dated May 3, 2015.
Second Office Action in Chinese Application No. 201180053405.6 dated Dec. 4, 2015.
Office Action in Japanese Application No. 2013-540982 dated Jun. 2, 2014.
Written Opinion in Singapore Application No. 201303521-7 dated May 20, 2014.
International Search Report and Written Opinion in PCT/US07/07601 dated Jul. 18, 2008 in 11 pages.
International Preliminary Report on Patentability in PCT/US2007/007601 dated Sep. 30, 2008 in 8 pages.
Supplementary European Search Report in Application No. 07754164.7 dated Dec. 20, 2010 in 7 pages.
Office Action in Chinese Application No. 200780020255.2 dated Mar. 4, 2013.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 2 pages.
Office Action in European Application No. 07754164.7 dated Dec. 14, 2015.
Office Action in Japanese Application No. 2011-502139 dated Aug. 17, 2015.
Third Office Action in Chinese Application No. 201180046104.0 dated Apr. 14, 2016.
Office Action in Japanese Application No. 2015-533132 dated Apr. 25, 2016.
Office Action in Canadian Application No. 2884796 dated Apr. 28, 2016.

(56) References Cited

OTHER PUBLICATIONS

Office Action in Japanese Application No. 2015-075644 dated Apr. 5, 2016 in 15 pages.
Office Action in Japanese Application No. 2011-516466 dated May 30, 2016.
Office Action in Russian Application No. 2015114568 dated May 16, 2016.
Office Action in Chinese Application No. 201310537815.9 dated Jul. 5, 2016.
Office Action in Chinese Application No. 201310717573.1 dated Jul. 29, 2016.
Office Action in Japanese Application No. 2014-225580 dated Oct. 3, 2016.
Partial Supplementary Search Report in European Application No. 09826977.2 dated Oct. 4, 2016.
Decision of Rejection in Chinese Application No. 201180046104.0 dated Oct. 17, 2016.
Office Action in Canadian Application No. 2816612 dated Oct. 7, 2016.
Office Action in European Application No. 09839809.2 dated Dec. 8, 2016.
International Search Report and Written Opinion in PCT/US/2016/066848 dated May 1, 2017.
Supplementary Examination Report in Singapore Application No. 11201501987U dated May 17, 2017
Office Action in Chinese Application No. 201310537815.9 dated Jun. 2, 2017.
Office Action in Canadian Application No. 2816612 dated Aug. 8, 2017.
Guo, F., Understanding Memory Resource Management in Vmware vSphere 5.0, Vmware, 2011, pp. 1-29.
Hameed, CC, "Disk Fragmentation and System Performance", Mar. 14, 2008, 3 pages.
Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.
Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.
Office Action in European Application No. 11767118.0 dated Feb. 3, 2017.
International Search Report and Written Opinion in PCT/US2017/055156 dated Dec. 13, 2017.
Krsul et al., "VMPlants: Providing and Managing Virtual Machine Execution Environments for Grid Computing", Nov. 6, 2004 (Nov. 6, 2004), Supercomputing, 2004. Proceedings of the ACM/IEEE SC2004 Conference Pittsburgh, PA, USA Nov. 6-12, 2004, Piscataway, NJ, USA, IEEE, 1730 Massachusetts Ave., NW Washington, DC 20036-1992 USA, 12 pages.
Zhao et al., "Distributed file system support for virtual machines in grid computing", Jun. 4, 2004 (Jun. 4, 2004), High Performance Distributed Computing, 2004. Proceedings. 13th IEEE International Symposium on Honolulu, HI, USA Jun. 4-6, 2004, Piscataway, NJ, USA, IEEE, p. 202-211.
Office Action in Indian Application No. 5937/CHENP/2010 dated Jan. 19, 2018.
Office Action in Indian Application No. 6210/CHENP/2010 dated Mar. 27, 2018.
Office Action in Chinese Application No. 201310537815.9 dated Feb. 1, 2018.
Office Action in European Application No. 07754164.7 dated Jan. 25, 2018.
Arends et al., DNS Security Introduction and Requirements, RFC 4033, Mar. 2005, 21 pages.
Ariyapperuma et al., "Security Vulnerabilities in DNS and DNS-SEC." The Second International Conference on Availability, Reliability and Security, IEEE, 2007, 8 pages.
Chandramouli et al., "Challenges in Securing the Domain Name System." IEEE Security & Privacy4.1 (2006),pp. 84-87.
Cohen et al., "Proactive Caching of DNS Records: Addressing a Performance Bottleneck", Proceedings of Saint 2001 Symposium on Applications and the Internet; 8-12, Jan. 8, 2001, IEEE Computer Society, pp. 85-94.
Eastlake, Donald, Domain Name System Security Extensions, RFC 2535, Mar. 1999, 47 pages.
JH Software, Moving a DNS Server to a New IP Address, last updated Jan. 26, 2006, 1 page.
Office Action in Application No. 09729072.0 dated May 14, 2018.
Examination Report in Indian Application No. 6213/CHENP/2010 dated May 23, 2018.
Office Action in European Application No. 11767118.0 dated Jul. 25, 2018.
Extended Search Report in European Application No. 18156163 dated Sep. 3, 2018.
Office Action in Chinese Application No. 2013800492635 dated Aug. 30, 2017.
International Preliminary Report on Patentability in PCT/US/2016/066848 dated Jun. 19, 2018.
Office Action in Application No. 09729072.0 dated Dec. 7, 2018.
Examination Report in Indian Application No. 4487/DELNP/2013 dated Dec. 28, 2018.

* cited by examiner

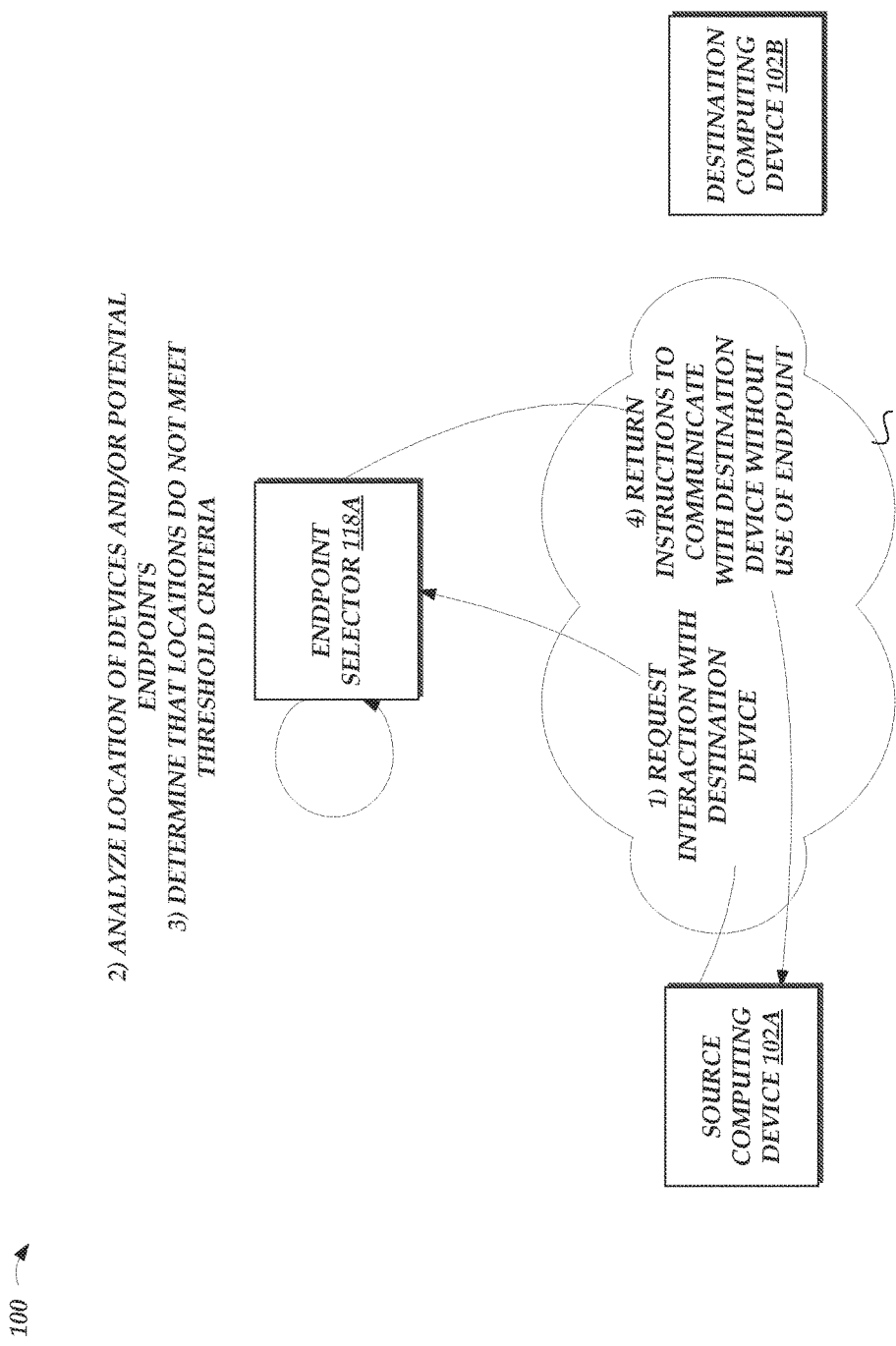

USE OF VIRTUAL ENDPOINTS TO IMPROVE DATA TRANSMISSION RATES

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

In some instances, the rate at which data can be transmitted over a communication network from a first device to a second device depends on the intermediary devices on the communication network over which the data is passed. The time required to transmit the data between intermediary devices can vary greatly based on the computing resources available to and the configuration of the intermediary devices. In public networks, such as the Internet, intermediary devices are often not under control of either the sending device or receiving device. Moreover, intermediary devices within public networks often operate under pre-established protocols that cannot be easily modified by sending and receiving devices.

In some instances, rapid transmission of information can be facilitated by distributed, interconnected networks of data centers. Illustratively, service providers or content creators (such as businesses, artists, media distribution services, etc.) can employ interconnected data centers, sometimes referred to as "content delivery networks" (CDNs), to deliver content (such as web sites, web content, or other digital data) or provide other services to users or clients. The content may be replicated or distributed among the data centers according to existing routing and addressing technologies, thereby enabling multiple data centers associated with the CDN to provide similar or identical content to client computing devices. In some instances, each data center of a CDN, or any location where it may have computing resources, may be referred to as a point-of-presence ("POP"). A CDN can maintain POPs over a wide area (or worldwide) in an attempt to ensure that a CDN is nearby to any requesting device. This minimizes the number of intermediary devices on public networks that must be utilized when transmitted content from the CDN to the client.

While useful in some instances, the use of CDNs is not necessarily applicable in all data transfers. For example, point-to-point transmission of information that is not intended to be replicated (e.g., transmission of data between a first specific device and a second specific device) generally does not benefit from existing CDN systems. Thus, these data transmissions often utilize conventional techniques (e.g., transmission via public intermediary devices), which results in highly variable, and often decreased, data transmission rates.

BRIEF DESCRIPTION OF THE DRAWINGS

FIG. 5 is a block diagram depicting interactions for determining that locations of a source computing device, destination computing device, or endpoints within the data transmission system do not meet a set of threshold criteria for use of the data transmission system, and for instructing the source computing device to communicate with the destination computing device over an existing communication network;

DETAILED DESCRIPTION

Figure 1:
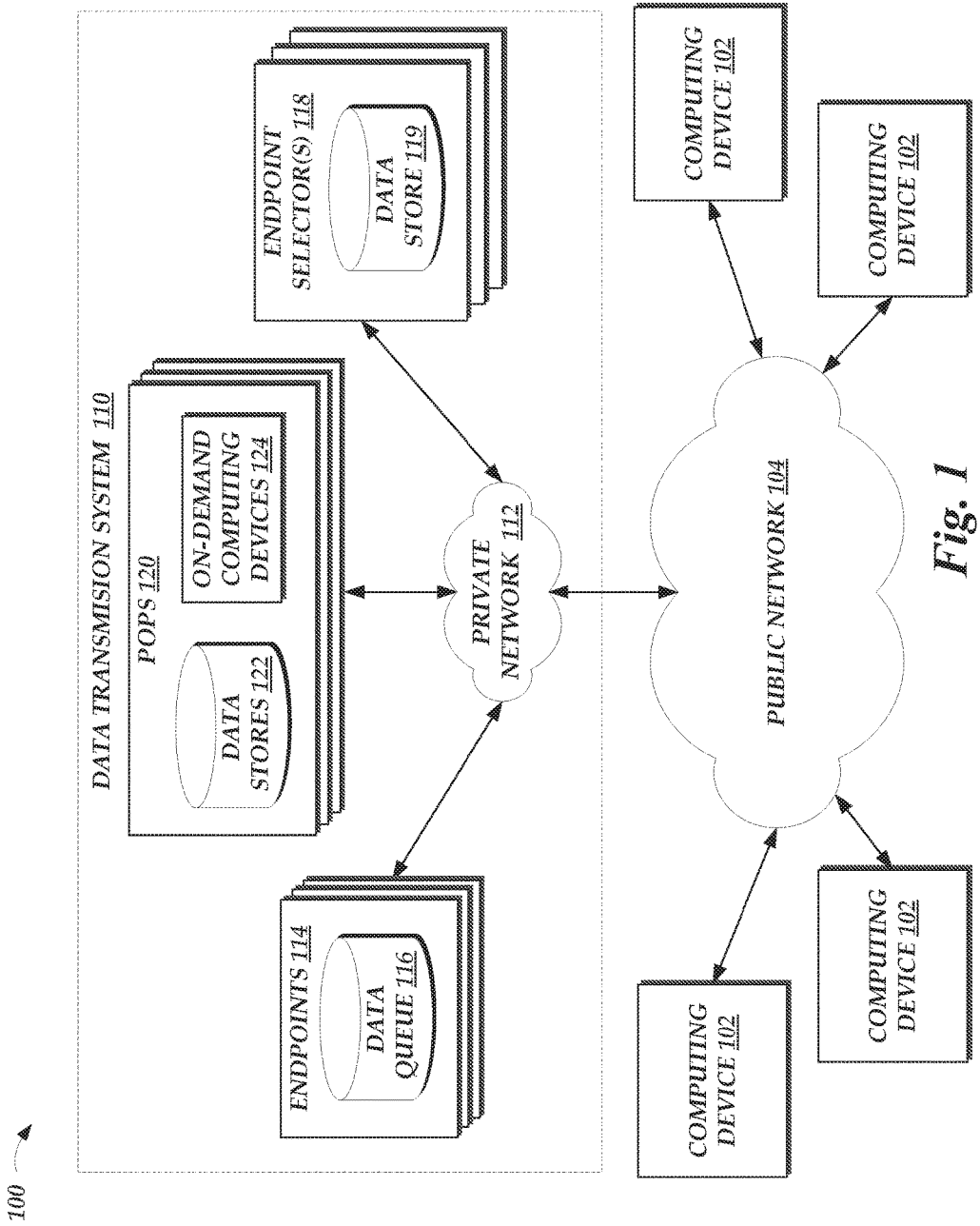
FIG. 1 is a block diagram depicting an illustrative logical network 100 including computing devices in communication over a public network, and a data transmission system configured to enable high-data-rate transmission of information between the computing devices.

Generally described, aspects of the present disclosure relate to enabling high-data-rate transmissions between two devices on a communication network. Specifically, the present disclosure enables two devices connected via a public network (e.g., a global area network (GAN), such as the Internet) to communicate with one another at least partly via a data transmission system expected to provide higher-data-rate transmissions than would be possible using solely the public network. The data transmission system may include a number of geographically distributed endpoints, each of which may communicate with devices on the public network, as well as with one another via a private network. Thus, a source computing device may transmit, via a public network, data to a first endpoint of the data transmission system for delivery to a destination computing device. The data transmission system may transmit the data from the first endpoint to a second endpoint via a private network, and from the second endpoint to the destination computing device via the public network. Because the use of public networks may be limited solely to client communication with endpoints, delays and errors that are common on those public networks may be reduced. Further, because endpoints may be selected such that they are geographically close to client devices, the frequency and effect of those errors and delays may be limited. Still further, the transmission of data between endpoints, rather than transmitting from a source computing device to a destination computing device without the use of endpoints, may increase the data transmission rate of stateful communication protocols such as the transmission control protocol (TCP). To ensure consistent states between sending and receiving devices, stateful communication protocols generally rely on data acknowledgement messages, the speed of which is limited by the round-trip transmission time between the two devices. Thus, by transmitting data via multiple separate stateful connections, the round trip time of each connection may be reduced, and the data-rate of transmissions between a source and destination computing device can be increased.

In some embodiments, the data transmission system may dynamically determine endpoints within the system to be used when transferring data between two computing devices. Illustratively, when a source computing device requests transmission of data to a destination computing device, the data transmission system may determine at least two endpoints to utilize in facilitating the transfer: a first endpoint nearby to the source computing device, and a second endpoint nearby to the destination computing device. By determining endpoints located nearby to both the source and destination computing devices, the use of public networks (e.g., between the source device and the first endpoint and between the second endpoint and the destination computing device) may be limited. As the use of public networks may be more likely to incur errors or delays, minimizing the use of these networks may generally increase the speed of data transmissions.

Proximity of computing devices (e.g., whether a device is "nearby to" or "far from" another device) may be described with respect to network distance, which reflects path used to communication between two devices on a shared communication network. Network distance may refer to any individual metric regarding that path, such as the latency incurred when communicating via the network path or the number of intermediate devices within the network path (e.g., network "hops"). Network distance may also refer to a metric derived from individual network communication metrics or combinations thereof. For example, network distance may refer to a network path's weight or score, which may be calculated based on a combination of latency or hops on that network path, as well as other factors, such as preference values or weights assigned to various paths. As discussed in detail below, embodiments of the present disclosure may utilize network distance to select preferred communication channels over a network (e.g., to select whether to utilize the data transmission system, to select endpoints within the data transmission system to utilize in communicating with source or destination client computing devices, etc.). In addition, embodiments of the present disclosure may utilize other communication metrics alternatively or in addition to network distance, such as the bandwidth of a communication path, the percentage of packet loss occurring over a communication path, the frequency of other errors or delays over the path, the availability of the path (e.g., the frequency that the path stops functioning), the variation in error, packet loss, or availability rates over time (e.g., the consistency of the network). These metrics, including network distance, percentage of packet loss, frequency of errors, or the availability of a path, may be referred to as metrics of "network quality."

In some instances, minimization of network distance or maximization of network quality between a client computing device and the data transmission system may be facilitated by dynamic generation of endpoints. Illustratively, where a client computing device wishes to utilize the data transmission system, but is more than a threshold network distance away from any available endpoint within the data transmission system, the data transmission system may operate to dynamically generate a new endpoint for use by the client computing device. As a further example, a new dynamically generated endpoint may be created when no existing endpoint (or no endpoint within a threshold network distance) provides a communication path of sufficient network quality to the client computing device. These dynamically generated endpoints may be implemented, for example, as virtual computing devices executed by physical computing devices located in data centers operated by the data transmission system. Thus, a client computing device may be enabled to utilize the data transmission system even when no preexisting endpoint exists nearby to the client computing device.

Further, the data transmission system may be configured to attempt to ensure that transmission of data over the data transmission system will occur at a higher data-rate than would otherwise be expected without the use of the data transmission system. Accordingly, when a request is received at the data transmission system to facilitate data transmission between a first and second computing device, the data transmission system may attempt to estimate whether the data transmission would occur more quickly on the data transmission system than on a public network connecting the first and second computing devices. In the instance that the transmission would occur more quickly on the public network, the data transmission system may decline the request by instructing the two computing devices to utilize the public network. Thus, the data transmission system may generally attempt to ensure that the highest data transmission rate is achieved between two computing devices.

The foregoing aspects and many of the attendant advantages of the present disclosure will become more readily appreciated as the same become better understood by reference to the following, when taken in conjunction with the accompanying drawings.

FIG. 1 is a block diagram depicting an illustrative operating environment 100 in which a data transmission system 110 may facilitate transmission of data between various computing devices 102 in communication with the data transmission system 110 via a public network 104. Computing devices 102 may include any number of different computing devices capable of communicating with one another and with the data transmission system 110, including personal computing devices, server computing devices, and virtual computing devices operating on physical host computing devices. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. In some instances, a computing device 102 may be operated as a personal device of a user. In other instances, a computing device 102 may implement a network-accessible service, such as a web site, database, or data storage service accessible to other computing devices 102. While shown as individual devices, one or more of the computing devices 102 may be associated with or operate as part of a collection of computing devices 102 configured to implement a desired functionality on the public network 104. Further, while shown as distinct from the data transmission system 110, in some instances computing devices 102 may be associated with or form part of the data transmission system 110, and may communicate with various other components of the data transmission system via a private network 112 (described in more detail below). Thus, computing devices 102 may generally represent any devices utilized to transmit data over the public network 104.

The public network 104 may be any wired network, wireless network, or combination thereof, operating as a collection of autonomous network systems under the control of various entities for use by the various computing devices 102. Illustratively, the public network 104 may include personal area networks, local area networks, wide area networks, cable networks, satellite networks, cellular telephone networks, and combinations thereof. In the example environment of FIG. 1, public network 104 is a global area network (GAN), such as the Internet. Protocols and components for communicating via the other aforementioned types of communication networks are well known to those skilled in the art of computer communications and thus, need not be described in more detail herein. As will be appreciated by one of skill in the art, operation of public networks 104 is generally subject to the operation of each autonomous system within the public network 104, as well as various agreements between autonomous systems regarding how such systems operate. As such, data transmission over a public network 104 may be highly variable and largely unpredictable, often resulting in slow rates of data transmission between computing devices 102, even where both computing devices 102 are otherwise capable of much higher rates of data transmission on the public network 104 generally.

In order to enable higher-speed transmission of data across the public network 104, a data transmission system 110 is described herein that can circumvent portions of the public network 104 that would otherwise delay or slow data transmissions, and that can further optimize communications between computing devices 102 without requiring reconfiguration of the transmission protocols used by those devices 102. As shown in FIG. 1, the illustrative data transmission system 110 includes a plurality of endpoints 114, a plurality of points of presence (POPs) 120, and one or more endpoint selectors 118, each in communication with one another via a private network 112.

The private network 112 may include any combination of various network types described above operated on behalf of the data transmission system 110, alone or in conjunction with other services. While shown as distinct from the public network 104, the private network 112 in some instances may be physically co-mingled with the private network 104. For example, the private network 112 may be formed by one or more leased lines on the public network 104 that provide dedicated communications to the data transmission system 110. Because the private network 112 is operated on behalf of the data transmission system 110 (e.g., independently or in conjunction with other services associated with the data transmission system 110), the number of delays and errors caused by transmission of data across the private network may generally be less than the number of delays and errors caused by transmission of data across the public network 104. Moreover, because the private network 112 is operated on behalf of the data transmission system 110, the functionality of the private network 112 (e.g., the protocols used therein or the configuration of network devices operating as part of the private network 112) may be modified by the data transmission system 110 without reducing the ability of the data transmission system 110 to interact with the public network 104.

Each endpoint 114 may correspond to a computing device, or collection of computing devices, configured to enable data transmission to and from other endpoints 114, as well as the various computing devices 102. In one embodiment, endpoints 114 may operate in pairs (generally referred to as source- and destination-side endpoints 114), and enable two computing devices 102 to communicate via the data transmission system 110. Specifically, a source-side endpoint 114 may be configured to receive a request from a first computing device 102 to transmit data to a second computing device 102. Thereafter, the source-side endpoint 114 may transmit the data a destination-side endpoint 114 nearby to the second computing device. The destination-side endpoint 114, in turn, can transmit the data to the second computing device 102, thus facilitating communication of the first and second computing devices 102 via the data transmission system 110. For example, where a user computing device (e.g., a first computing device 102) wishes to upload a document to a network-based storage service (e.g., operating on a second computing device 102), the user computing device may transmit the document to a first, source-side endpoint 114. The source-side endpoint 114 can then transmit the document to a second, destination-side endpoint 114, which in turn can transmit the document to the network-based storage service. Thus, the user computing device is enabled to upload data to the network-based storage service by use of the data transmission system 110, which may substantially increase the speed and reliability of such uploads. To enable endpoints 114 to maintain a state of connections to computing devices 102 and other endpoints 114, the endpoints 114 include a data queue 116 that can be utilized to store data received (e.g., from a source computing device 102) and awaiting transmission (e.g., to a destination-side endpoint 114). In one embodiment, the data queue 116 may be implemented in transitory memory of an endpoint 114, such as in a memory buffer (e.g., the TCP receive buffer) stored within random access memory ("RAM"). In another embodiment, the data queue 116 may be implemented in whole or in part on non-transitory memory, such as a hard disk drive of the endpoint 114.

The data transmission system 110 further includes one or more endpoint selectors 118 configured to enable a computing device 102 to locate and communicate with an endpoint 114 nearby to the computing device 102. As will be described in more detail below, each endpoint selector 118 may obtain requests from a computing device 102 to transmit information via the data transmission system 110, select an endpoint 114 nearby to the computing device 102, and return an identifier of that endpoint 114 to the request computing device, such that computing device 102 may transmit data over the data transmission system 110 by communicating that data to the endpoint 114. In one embodiment, the endpoint selector 118 may be implemented within a resolution service, such as a domain name service ("DNS") resolver. For example, the endpoint selector 118 may be configured to receive requests from a computing device 102 to resolve an identifier of a destination computing device 102 into a network address (e.g., an internet protocol ["IP"] address), select an endpoint 114 nearby to the computing device 102, and return a network address of the endpoint 114 as a resolution of the request. Thus, the endpoint selectors 118 may enable each computing device 102 to automatically connect to a nearby endpoint 114 of the data transmission system 110 by use of a network identifier of a destination computing device 102, without requiring reconfiguration of the source computing device 102.

To assist in determining an endpoint 114 nearby to a requesting computing device 102, the endpoint selectors 118 can include a data store 119 including information regarding network paths between computing devices 102 and endpoints 114, as well as regarding paths between computing devices 102 themselves or endpoints 114 themselves. Illustratively, the information may include historical data regarding data transmissions across the data transmission system 110, such as a latency of communications, number of hops, bandwidth, or other network quality metrics regarding a path between a computing device 102 and an endpoint 114, between two endpoints 114, or between two computing devices 102. As will be described below, this information may be utilized by the endpoint selectors 118 to determine whether use of the data transmission system 110 is likely to result in higher-data-rate transmission than two computing devices 102 could achieve independently, as well as to determine an endpoint 114 to which a computing device 102 should connect when utilizing the data transmission system 110.

Still further, the illustrative data transmission system 110 of FIG. 1 can include a plurality of points of presence ("POPs") 120. Each POP 120 may include a collection of on-demand computing devices 124 and data stores 122 available to be rapidly provisioned with computer executable instructions in order to implement various functionalities at the request of the data transmission system 110. While shown as part of the data transmission system 110, the POPs 120 may, in some instances, be operated separately from other components of the data transmission system 110 (e.g., as an part of a distinct service sharing a private network 112 with the data transmission system 110). In some instances, the POPs 120 may collectively be referred to as a "cloud computing" environment.

In accordance with embodiments of the present disclosure, the on-demand computing devices 124 within the POPs 120 may be utilized by the data transmission system 110 to dynamically generate virtual endpoints 114. Each virtual endpoint 114 implemented on a POP 120 may operate as an endpoint 114, described above, and therefore enable communication to and from the computing devices 102 and other endpoints 114. The use of virtual endpoints 114 may be beneficial, for example, where no preexisting endpoint 114 is located within a threshold network distance to a computing device 102 requesting use of the data transmission system 110, or when no preexisting endpoint 114 is closer to the computing device 102 than a POP 120. In such instances, the data transmission system 110 may select a POP 120 nearby to the computing device 102, and cause a virtual endpoint 114 to be created within the POP 120. The computing device 102 may thereafter communicate with the data transmission system 110 via the virtual endpoint 114. Thus, data transmission system 110 of FIG. 1 is not limited to the use of preexisting endpoints 114, but may dynamically create virtual endpoints 114 in order to minimize network distance or maximize network quality metrics between the data transmission system 110 and the various source or destination computing devices 102.

It will be appreciated by those skilled in the art that the data transmission system 110 may have fewer or greater components than are illustrated in FIG. 1. In addition, the data transmission system 110 could include various web services and/or peer-to-peer network configurations. Thus, the depiction of the data transmission system 110 in FIG. 1 should be taken as illustrative. For example, in some embodiments, components of the data transmission system 110, such as the endpoint selectors 118, may be executed by one more virtual machines implemented within the POPs 120.

Any one or more of the endpoints 114, endpoint selectors 118, and POPs 120, may be embodied in a plurality of components, each executing an instance of the respective endpoints 114, endpoint selectors 118, and POP 120. A server or other computing component implementing any one of the endpoints 114, endpoint selectors 118, and POPs 120 may include a network interface, memory, processing unit, and computer readable medium drive, all of which may communicate which each other by way of a communication bus. The network interface may provide connectivity over the private network 112, the public network 104, and/or other networks or computer systems. The processing unit may communicate to and from memory containing program instructions that the processing unit executes in order to operate the respective endpoints 114, endpoint selectors 118, and POPs 120. The memory may generally include RAM, ROM, other persistent and auxiliary memory, and/or any non-transitory computer-readable media. While endpoints 114 and endpoint selectors 118 are described above as distinct from the POP 120, some embodiments of the endpoints 114 and endpoint selectors 118 may be implemented by computing devices within the POP 120 (e.g., as virtual machines within the POP 120).

Figure 2:
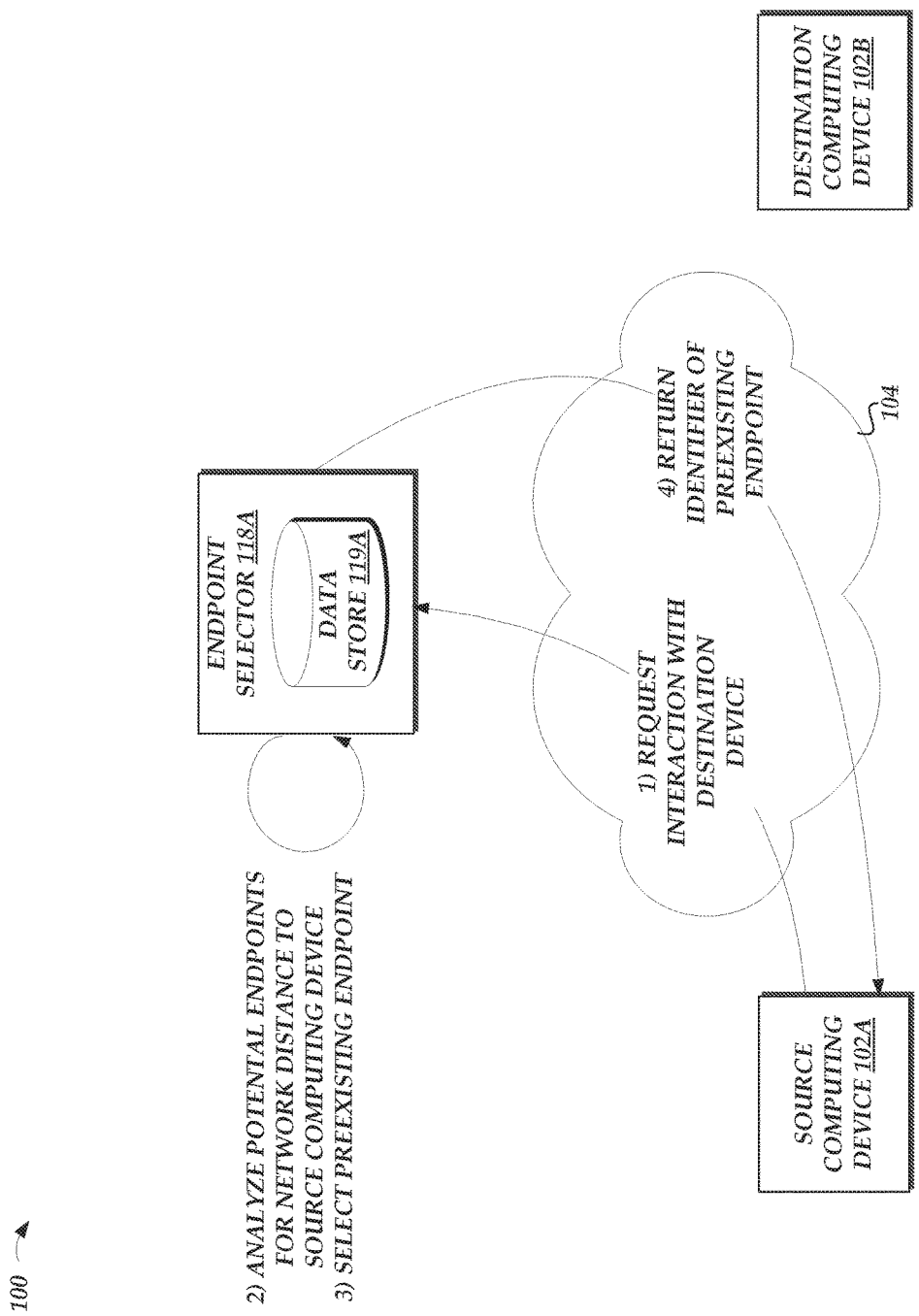
FIG. 2 is a block diagram depicting interactions between a source computing device and the data transmission system of FIG. 1, in order to select a source-side endpoint within the data transmission system for use by the source computing device.

With reference to FIG. 2, an illustrative set of interactions for initiating a connection between a source computing device 102 and the data transmission system 110 will be described. Specifically, the interactions of FIG. 2 depict the use of an endpoint selector 118A within the data transmission system 110 to determine an endpoint 114 nearby to the source computing device 102, and to notify the source computing device 102 of that endpoint. For ease of illustration, components within the data transmission system 110 other than the endpoint selector 118A are omitted from FIG. 2.

The interactions of FIG. 2 begin at (1), where a source computing device 102A transmits a request to the endpoint selector 118A to transmit data to a destination computing device 102B. In one embodiment, the request may be automatically generated by the source computing device 102A in response to instructions to communicate with the destination computing device 102B. For example, where the source computing device 102A has been configured to utilize the data transmission service 110 as a proxy for communication requests, the source computing device 102A may reroute all (or a designated portion) of communication requests to the endpoint selector 118A. As a further example, where the endpoint selector 118A operates as a DNS server, the destination computing device 102A may designate the endpoint selector 118A as an authoritative resolver for an identifier (e.g., a uniform resource identifier, or "URI") of the destination computing device 102B. Thus, when the source computing device 102A attempts to connect to the human-readable identifier of the destination computing device 102B, the source computing device 102A may automatically generate and transmit the request to the endpoint selector 118A.

After receiving a request from the source computing device 102A, the endpoint selector 118A, at (2), analyzes potential endpoints of the data transmission system 110 (e.g., both the preexisting endpoints 114 shown in FIG. 1, as well as potential virtual endpoints that may be dynamically created within the POPs 120 of FIG. 1) to determine an expected network distance between the endpoints 114 and the source computing device 102A. Illustratively, an expected network distance between each endpoint 114 and the source computing device 102A may be determined based at least in part on data within the data store 119A of the endpoint selector. As noted above, the data store 119A may include data regarding prior communications between various computing devices 102 and endpoints 114 of the data transmission system 110. Such data may include, but is not limited to, the latency of communications, the bandwidth available, the number of hops, or other network quality metrics regarding a communication path between the endpoints 114 and various computing devices 102. Thus, the endpoint selector 118A may inspect the data within the data store 119A to determine whether a network distance or network quality metric between the source computing device 102A and any potential endpoint 114 of the data transmission system 110 satisfies a threshold value. In one embodiment, this threshold may be an absolute value (e.g., a latency below 50 ms). In other embodiments, the threshold may be relative or variable. For example, the threshold network value may be set based at least in part on the network distance or network quality metrics between the source computing device 102A and a destination computing device 102B (e.g., to ensure that the network distance between the source computing device 102A and a selected endpoint 114 is not greater than the network distance between the source computing device 102A and the destination computing device 102B).

Additionally or alternatively to the use of data within the data store 119, the endpoint selector 118A may in some instances generate data regarding network distance or network quality metrics between the source computing device 102A and potential endpoints 114 within the data transmission system 110 (e.g., preexisting endpoints 114 and potential virtual endpoints 114 within the POPs 120). For example, the endpoint selector 118A may cause each of the endpoints 114 and POPS 120 of FIG. 1 to generate network probes, such as Internet Control Message Protocol ("ICMP") packets, and to transmit those probes to computing devices 102 in order to assess the network distance or network quality metrics between computing devices 102 and the respective endpoints 114 or POPS 120. Thus, the endpoint selector 118A may utilize both passively and actively collected data to determine network distances or network quality metrics between the source computing device 102A and the various potential endpoints 114.

In some embodiments, the endpoint selector 118A may be configured to estimate the network distance or network quality metrics between the source computing device 102A and a potential endpoint, in order to supplement or replace the need for collected network data. In one instance, the endpoint selector 118A may estimate the network distance or network quality metrics between the source computing device 102A and a potential endpoint 114 based on data from similar source computing devices 102, similar endpoints 114, or both. For example, where previously collected data regarding the network distance or network quality metrics between the source computing 102A and a given endpoint 114 does not exist, the endpoint selector 118A may utilize previously collected data regarding the network distance or network quality metrics between the given endpoint 114 and other computing devices 102 originating from similar network addresses as the source computing device 102A (e.g., sharing a common internet service provider ["ISP"]). As a further example, the endpoint selector 118A may estimate network distance between the source computing device 102A and a given endpoint 114 based on the geographical distance between the source computing device 102A and the given endpoint 114 (e.g., as determined based on address geolocation techniques, which are known in the art). Thus, the endpoint selector 118A may function to estimate network distance between the source computing device 102A and potential endpoints 114, even where no data regarding communication between those devices previously exists.

While the examples provided above discuss network distance between a source computing device 102A and potential endpoints 114, the same or similar techniques may be utilized to determine or estimate network distance between any two devices, including between potential endpoints 114 on the data transmission system 110 and between potential endpoints 114 and a destination computing device 102B. As will be discussed below, these network distances may be utilized, for example, to select a destination-side endpoint 114 nearby to a destination computing device 102B, in order to minimize the network distance transmitted data must travel over the public network 104. In addition, while the embodiments of FIG. 2 are discussed with reference to network distance, network quality may additionally or alternatively be utilized to select among potential endpoints 114.

In the illustrative example of FIG. 2, it is assumed that a preexisting endpoint 114 within the data transmission system 110 is located within a threshold network distance of the source computing device 102A. Thus, the endpoint selector 118A, at (4), returns an identifier of that preexisting endpoint 114 to the source computing device 102A. Illustratively, the identifier may include, for example, a network address (e.g., IP address) or URI of the preexisting endpoint 114, which the source computing device 102A may thereafter utilize to connect with the data transmission system 110

Figure 3:
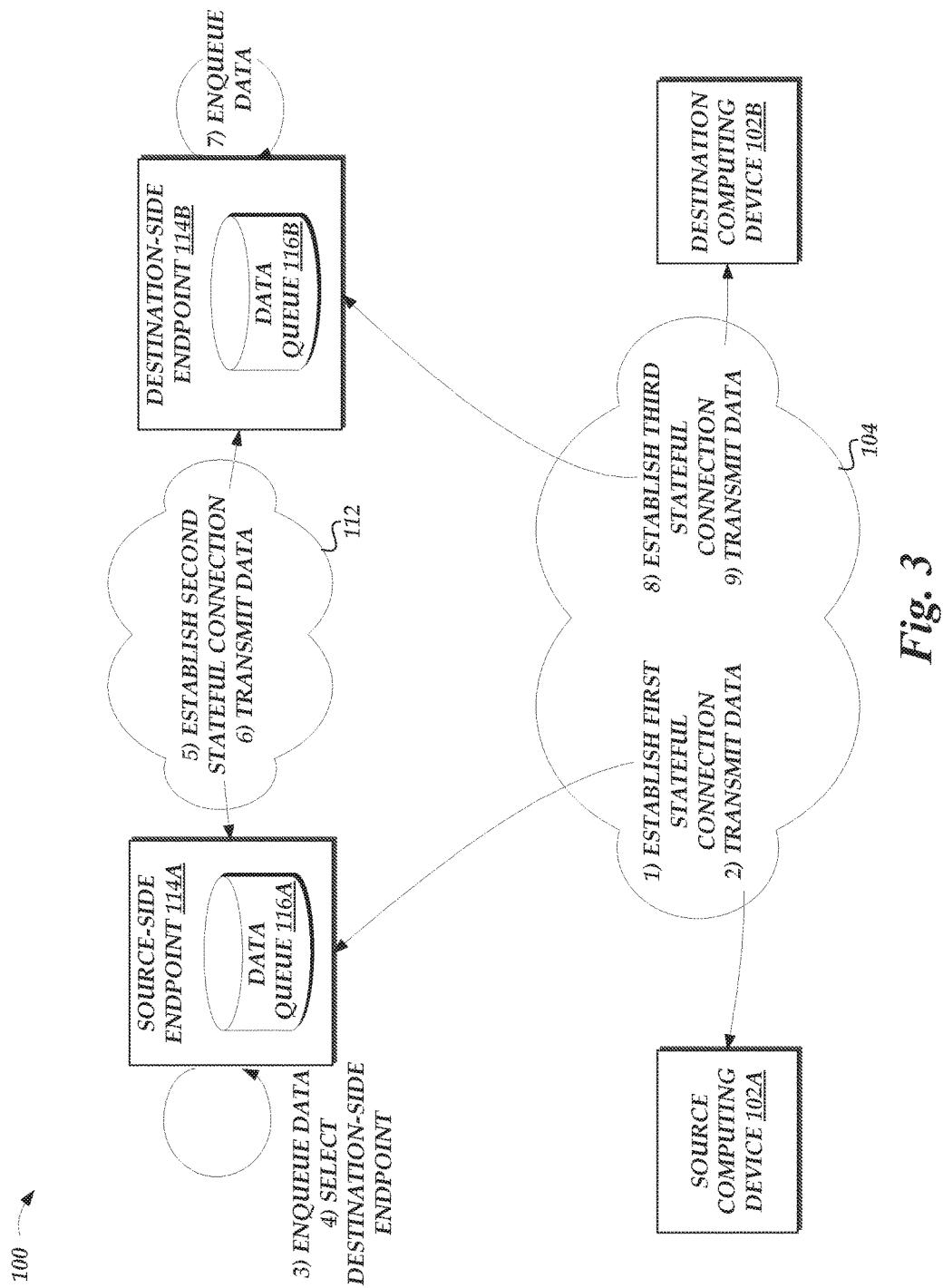
FIG. 3 is a block diagram depicting the transmission of data from the source computing device to a destination computing device, utilizing endpoints within the data transmission system.

With reference to FIG. 3, illustrative interactions for utilizing endpoints 114 within the data transmission system 110 to transmit information from a source computing device 102A to a destination computing device 102B will be described. Illustratively, the interactions of FIG. 3 may occur subsequently to those of FIG. 2, after the source computing device 102A has been provided with an identifier of a source-side endpoint 114 within the data transmission system 110, shown in FIG. 3 as source-side endpoint 114A.

The interactions of FIG. 3 begin at (1), where the source computing device 102A and the source-side endpoint 114A establish a stateful connection via the public network 104. Stateful connections may be, for example, communication channels in which at least one of a sender and receiver maintain information regarding a state of the connection, such as whether data transmitted via the communication channel was successfully received by a receiving device, and whether an acknowledgement of that receipt was received at a sending device. Illustratively, stateful connections may be established at the network level (e.g., by use of the TCP protocol or other stateful protocol), at the application level (e.g., by utilizing an application that maintains information regarding the state of an underlying protocol that is either stateful or stateless), or with a combination thereof. For ease of discussion, each of the stateful connections described with respect to FIG. 3 will be assumed to be TCP connections. However, the various stateful connections of FIG. 3 may, in some embodiments, utilize different types of stateful connections (e.g., utilizing different network-level protocols, application-level protocols, or combinations thereof).

After establishing the first stateful connection, at (2), the source computing device 102A transmits data to the source-side endpoint 114A via that first stateful connection. Beneficially, because the source-side endpoint 114A is located nearby to the source computing device 102A (e.g., within a threshold network distance, as described above with reference to FIG. 2), the potential for errors and delays caused by the public network 104 is low (e.g., as compared to transmitting data from the source computing device 102A to the destination computing device 102B without the use of endpoints 114). Moreover, because the round trip transmission time between the source-side endpoint 114A and the source computing device 102A is reduced, the time required to transmit data via the first stateful connection is reduced, as is the time required to recover from errors on the first stateful connection. For example, where the first stateful connection corresponds to a TCP connection, the TCP window (a variable which controls how much information may be sent by the TCP protocol without receiving an acknowledgement) may alter rapidly due to a low round-trip communication time, thereby handling the occurrence of errors on the public network 104 more efficiently.

After receiving data at the source-side endpoint 114A, that endpoint 114A enqueues the data into a data queue 116A. In one embodiment, the data queue 116A may be implemented in transitory memory of the source-side endpoint 114A, such as in a memory buffer (e.g., the TCP receive buffer) stored within random access memory ("RAM"). In another embodiment, the data queue 116A may be implemented in whole or in part on non-transitory memory, such as a hard disk drive of the source-side endpoint 114A.

At (4), the source-side endpoint 114A can select a device-side endpoint 114B to utilize in transmitting the data from the data queue 116A to the destination computing device 102B. Illustratively, the source-side endpoint 114A may select, as the destination-side endpoint 114B, any potential endpoint 114 within the data transmission system 110 that is nearby to the destination computing device 102B (e.g., within a threshold distance of the destination computing device 102B). In one embodiment, the source-side endpoint 114A may communicate with an endpoint selector 118 in order to determine a potential endpoint 114 within a threshold network distance to the destination computing device 102B (e.g., similarly to as described above in FIG. 2 with reference to determining a potential endpoint 114 within a threshold distance to the client computing device 102A). Still further, where no destination-side-endpoint exists nearby to the destination computing device 102B, or where a POP 120 exists closer than any pre-existing endpoint 114, the source may cause a new virtual endpoint 114 to be created on a POP 120 nearby to the destination computing device 102B. Interactions for dynamically generating a virtual endpoint 114 are described in more detail below with respect to FIGS. 4A and 4B. In the illustration of FIG. 3, it is assumed that the source-side endpoint 114A has selected a preexisting endpoint 114 of the data transmission system 110, shown in FIG. 3 as destination-side endpoint 114B.

Thereafter, at (5), the source-side endpoint 114A can establish a second stateful connection to the destination-side endpoint 114B (e.g., a TCP connection), via the private network 112. As noted above, because the private network 112 is operated on behalf of the data transmission system 110, the rate or errors or delays on the private network 112 is expected to be low in comparison to the public network 104. As such, in some instances, the source- and destination-side endpoints 114A and 114B may utilize an optimized communication protocol, such as a TCP protocol with a large starting transmission window, or a stateless protocol utilizing application-level state tracking and error correction, to ensure that the second stateful connection provides rapid communication between the source- and destination-side endpoints 114A and 114B.

Thereafter, at (6), the source-side endpoint 114A transmits the data from the data queue 116A (as received from the source computing device 102A and stored in the data queue 116A) to the destination-side endpoint 114B. In some instances, the source-side endpoint 114A may modify the data prior to transmission, such as by modifying header information of the data to note a network identifier of the original source computing device 102A, or otherwise encapsulating the data to ensure information is not lost or modified during transmission of the data through the data transmission system 110.

On receiving the data, the destination-side endpoint 114B, at (7), enqueues the data within its data queue 116B (e.g., as implemented in transitory or non-transitory memory of the destination-side endpoint). Thereafter, the destination-side endpoint 114B, at (8), establishes a third stateful connection (e.g., a third TCP connection) to the destination computing device 102 over the public network 104. At (9), the destination-side endpoint 114B utilizes the third stateful connection to transmit the data from the data queue 116B to the destination computing device 102B.

While not shown in FIG. 3, the source- and destination-side endpoints 114A and 114B may continue to facilitate transfer of information between the source and destination endpoints 102A and 102B over the data transmission service 110. Such transfer of data is generally expected to provide faster and more reliable service than would be achieved over the public network 104 alone. For example, because the data transmission system 110 utilizes a private network 112 between endpoints 114, the total potential for errors and delays between the two devices 102A and 102B is reduced. Moreover, stateful communication protocols are generally limited, at least in part, by the amount of unacknowledged or "in-flight" data allowed by a current state of the connection. For example, the Transmission Control Protocol (TCP) or other stateful communications protocols can use a "sliding window" communication protocol, in which only a set amount of data may be transmitted by a sender before receiving an acknowledgement by the receiver. While such limitations are intended to limit the effect of transmission errors, they can also reduce effective bandwidth of the connection, especially where the round trip transmission time is large. By segmenting transmissions between the source and destination computing devices 102A and 102B into multiple, independent stateful connections, the total amount of in-flight data allowed between the two devices 102A and 102B may be effectively multiplied (e.g., tripled, where two endpoints are used). More specifically, each pair of devices within the segmented network path may establish an independent transmission window, such that each additional, state-aware segment added to an initial point-to-point transmission path increases the total transmission amount of allowed in-flight data by an amount equal to the transmission window allowed on that additional, state-aware segment. Still further, because the network distance between each device 102A and 102B and their respective endpoints 114A and 114B is minimized, the round trip communication times between each device and endpoint 114 is reduced. This reduction in round trip communication times minimizes the effects of errors or delays on the public network 104 (e.g., causing reductions in the amount of "in-flight" data allowed), and increases the ability of each device 102 and endpoint 114 to recover from such delays (e.g., by reducing the time required to negotiate increases in the allowed level of "in-flight" data).

While the illustrative interactions of FIG. 3 are described in sequence, embodiments of the present application may modify the described sequence, omit interactions, or execute one or more interactions in parallel. For example, in one embodiment, interaction (5) (the establishment of a second stateful connection between source-side endpoint 114A and destination-side endpoint 114B) may occur immediately after interaction (1) (the establishment of a first stateful connection between the source computing device 102A and the source-side endpoint 114A). In another embodiment, interaction (5) may occur independently and prior to the other interactions described in FIG. 3. Illustratively, the source-side endpoint 114A may maintain pre-established stateful connections to various endpoints 114, including the destination-side endpoint 114B, such that the stateful connections need not be reestablished when a request to transmit data is received. These pre-established stateful connections may, in some instances, be selected from a pre-established pool of connections used to carry data originating from multiple computing devices 102, thus reducing the number of connections that must be maintained at each endpoint 114A.

Communication between endpoints 114 and computing devices 102 is described with reference to FIG. 3 as occurring via a public network 104. However, in some embodiments, this communication may additionally or alternatively occur on the private network 112. For example, where the destination computing device 102B is associated with the data transmission system 110 or otherwise has access to the private network 112, the third stateful connection may be established on that private network 112, further increasing the speed of data transfer to the destination computing device 102B. Alternatively, where the destination computing device 102B has access to the private network 112, the source-side endpoint 114A may transmit the data to the destination computing device via a stateful connection on that private network 112 without utilization of the destination-side endpoint 114B. In these instances, the destination-side endpoint 114B may be omitted. Various additional alternations of the interactions of FIG. 3 will be apparent to one of skilled in the art, based on the disclosure herein.

Figure 4A:
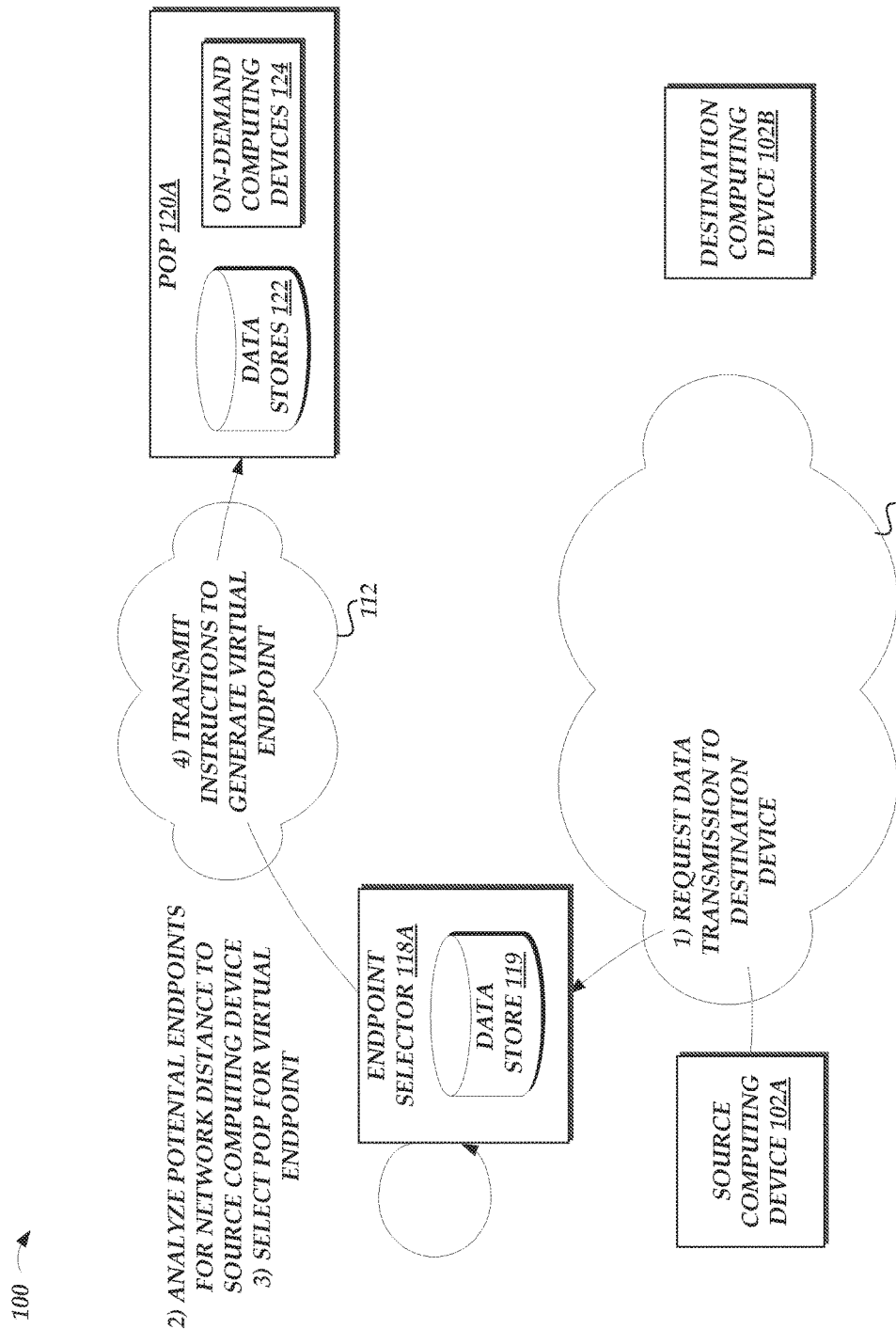
FIGS. 4A and 4B are block diagrams depicting interactions for dynamically generating a virtual endpoint within the data transmission system for use by a computing device.
Figure 4B:
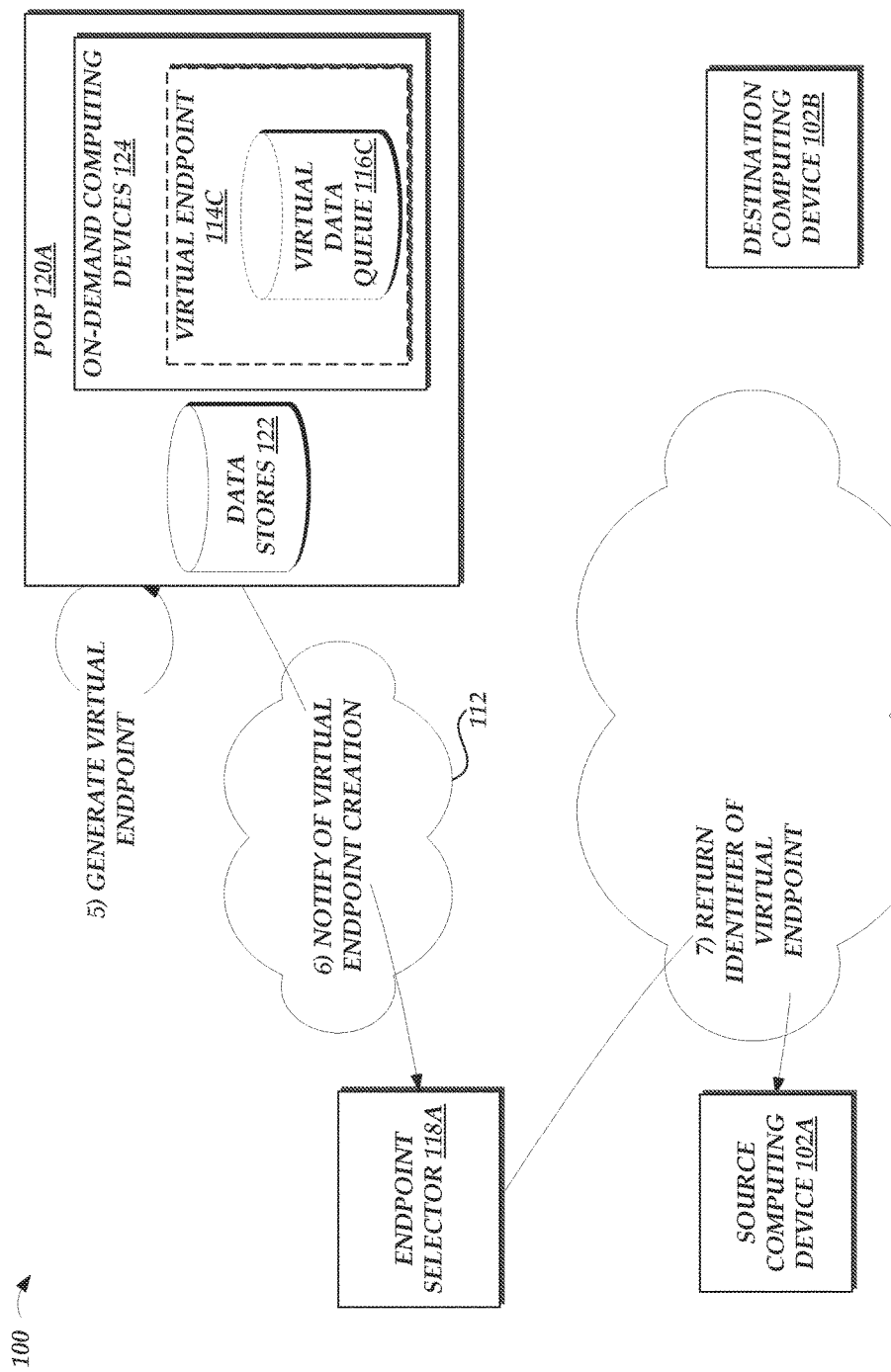

As noted above, potential endpoints 114 within the data transmission system 110 include both preexisting endpoints 114, as well as virtual endpoints 114 that may be dynamically created on POPs 120 associated with the data transmission system 110. One set of interactions for creating and utilizing such a virtual endpoint 114 is depicted in FIGS. 4A and 4B. While depicted separately for clarity, the interactions of FIGS. 4A and 4B will be described in conjunction, and numbering will be maintained between the two figures.

The interactions of FIGS. 4A and 4B begin at (1), where a source computing device 102A transmits a request to the endpoint selector 118A to interact with a destination computing device 102B. As discussed above with respect to FIG. 2, the request may be generated by a source computing device 102A in connection with a request to resolve an identifier of the destination computing device 102B (e.g., as a DNS request transmitted by the source computing device 102). The request may further be generated by the source computing device 102A based on a configuration of the source computing device (e.g., to utilize the data transmission service 110 as a proxy in communicating with the destination computing device 102B).

The interactions continue at (2), where the endpoint selector 118A analyzes the network distance between potential endpoints 114 within the data transmission system 110 and the source computing device 102A. As discussed above with respect to FIG. 2, this network distance may reflect the latency and/or number of hops on various network paths between endpoints 114 and the source computing device 102A, and may be calculated based on passively collected network data (e.g., data regarding previous transmissions between the data transmission system 110 and the source computing device 102A or other similar computing devices 102) or actively collected network data (e.g., data regarding network probes, such as ICMP packets, transmitted between the data transmission system 110 and the source computing device 102A). While the embodiments of FIG. 4A are discussed with reference to network distance, any network quality metric or combination of network quality metrics may be utilized by the endpoint selector 118A.

Unlike the interactions of FIG. 2, the results of analysis by the endpoint selector 118A may indicate that no preexisting endpoint 114 is within a threshold network distance to the source computing device 102A, and/or that a POP 120A is within a closer network distance to the source computing device 102A than any preexisting endpoint 114. As such, the endpoint selector 118A may determine that a virtual endpoint 114 should be created on the POP 120A, to enable the source computing device 102A to reach the data transmission system 110 over a minimum network distance. Accordingly, at (3), the endpoint selector 118A may select the POP 120A (e.g., representing the POP 120 with a minimum network distance to the source computing device 102A) for generation of a virtual endpoint 114.

Thereafter, at (4), the endpoint selector 118A can transmit instructions to the POP 120A to generate the virtual endpoint 114. Illustratively, the instructions may notify the POP 120A that a virtual computing device should be created, and that executable code implementing the functionality of an endpoint 114 (e.g., as contained within an executable disk image) should be provisioned onto the virtual computing device. In some instances, the instructions may further notify the POP 120A of various parameters usable by the virtual endpoint 114, such as an identity of the source computing device 102A or a destination computing device 102B with which the source computing device 102A wishes to communicate.

The interactions of FIGS. 4A and 4B then continue in FIG. 4B, where the POP 120A generates a virtual endpoint 114C in response to the received instructions. Illustratively, the virtual endpoint 114C may correspond to a virtual computing device, implemented on one or more host computing devices, provisioned with computer-executable instructions enabling the virtual computing device to carry out the functionalities described herein. As shown in FIG. 4B, the virtual endpoint 114C may include a virtual data queue 116C (e.g., representing a logical mapping to one or more portions of the data stores 122), enabling the virtual endpoint 114C to receive and forward information between the source computing device 102A and a destination computing device 102B.

At (6), the POP 120A can transmit a notification to the endpoint selector 118A that the virtual endpoint 114C has been established. The endpoint selector 118A, in turn, may transmit an identifier of the virtual endpoint 114C to the source computing device 102A. The source computing device 102A may thereafter establish a stateful communication channel to the virtual endpoint 114C on the public network 104, and utilize that communication channel to transmit data, via the data transmission system 110, to a destination computing device 102B. In this manner, the virtual endpoint 114C may function in the same way as a preexisting endpoint 114 (e.g., as described above with respect to FIG. 3).

In some embodiments, timing or ordering of the various interactions of FIG. 4B may be modified from those described above. For example, in order to facilitate rapid responses to client requests, the endpoint selector 118A may be configured to return an identified of the virtual endpoint 114C prior to receiving a notification, from the POP 120, that the virtual endpoint 114C has been created. Illustratively, the identifier of the virtual endpoint 114C may be pre-established, or may be selected by the endpoint selector and transmitted to the POP 120A, such that the endpoint selector 118A need not have received notification of the virtual endpoint 114C's creation prior to providing the identifier to the source computing device 102A. Thus, delays associated with creation of the virtual endpoint 114C may be reduced or eliminated. In one embodiment, the data transmission system 110 may be further configured to detect that a virtual endpoint 114C has not been utilized (e.g., by the source computing device 102A or other computing device 102) for a threshold period of time (e.g., 10 minutes), and to notify the POP 120A that the virtual endpoint 114C may be halted. In other embodiments, the POP 120A itself may be configured to automatically halt the virtual endpoint 114C.

In accordance with aspects of the present disclosure, the data transmission system 110 may be configured such that, when the data transmission system 110 is unlikely to increase the rate of data transmission between a source and destination computing device 102, the data transmission system 110 is not utilized by the source and destination computing devices 102. For example, where the source and destination computing devices 102 are located nearby to one another (e.g., in terms of network distance), use of the data transmission system 110 may not increase data transmission rates between the two devices 102. Accordingly, a set of interactions for determining whether use of the data transmission system 110 is likely to increase rates of transmission between two devices 102 is depicted in FIG. 5.

The interactions of FIG. 5 begin at (1), where a source computing device 102A transmits a request to the endpoint selector 118A to interact with a destination computing device 102B. As discussed above with respect to FIGS. 2 and 4A, the request may be generated by a source computing device 102A in connection with a request to resolve an identifier of the destination computing device 102B (e.g., as a DNS request transmitted by the source computing device 102). The request may further be generated by the source computing device 102A based on a configuration of the source computing device (e.g., to utilize the data transmission service 110 as a proxy in communicating with the destination computing device 102B).

The interactions continue at (2), where the endpoint selector 118A analyzes the locations of the source computing device 102A, the intended destination computing device 102B, and/or potential endpoints 114 within the data transmission system 110 to determine whether those locations meet a set of threshold criteria maintained by the data transmission system 110. In one embodiment, the threshold criteria is based at least in part on a network distance between the source computing device 102A and the destination computing device 102B, such that if the two devices 102A and 102B are less than a threshold network distance apart, the threshold criteria is not satisfied. For example, the threshold criteria may indicate that if a communication path between the two devices 102A and 102B over the public network 104 has a latency of less than 100 milliseconds (ms), the threshold criteria for use of the data transmission system 110 is not satisfied. Threshold criteria regarding the communication path between the two devices 102A and 102B may be established according to any network quality metric.

In another embodiment, the threshold criteria is based at least in part on a network distance between a source or destination computing device 102A or 102B and a closest potential endpoint 114 of the data transmission system 110, such that if no potential endpoint 114 (e.g., a preexisting endpoint 114 or a dynamically created virtual endpoint 114 created within a POP 120) is within a threshold network distance of the respective source or destination computing device 102A or 102B, the threshold criteria is not satisfied.

For example, the threshold criteria may indicate that if no endpoint 114 is able to communicate with the source computing device 102A (e.g., over the public network 104) at less than 50 ms, then the threshold criteria for use of the data transmission system 110 is not satisfied. As in the example above, threshold criteria regarding the communication path between the source device 102A and an endpoint 114 may be established according to any network quality metric.

In yet another embodiment, the threshold criteria is based on a comparison of network distances. For example, the data transmission system 110 may define a first network distance as the network distance between the source and destination computing devices 102A and 102B over the public network 104, and define a second network distance as total network distance of a communications path that the source and destination computing devices 102A and 102B would use to communicate, if the data transmission system 110 were employed for that communication (e.g., sum of the network distances between the source computing device 102A and a first endpoint 114, the first endpoint 114 and a second endpoint 114, and the second endpoint 114 and the destination computing device 102B). The data transmission system 110 may further establish threshold criteria specifying that if the first network distance is greater than the second network distance, the threshold criteria are not satisfied. As in the examples above, threshold criteria regarding these communication paths may be established according to any network quality metric.

On determining that the threshold criteria is not satisfied (and thus, that use of the data transmission system 110 is not likely to increase the rate of data transmission between the source and destination computing devices 102A and 102B), the endpoint selector 118A may return to the source computing device 102A instructions to communicate with the destination computing device 102B at least partially outside of the private network 112, for example via traditional communication protocols and over an existing network between the source and destination computing devices. Illustratively, where the endpoint selector 118A serves as a DNS resolver for the source computing device 102A, the endpoint selector 118A may return an network or IP address of the destination computing device 102B or another computing device in the public network 104 (e.g., rather than a network address of an endpoint 114), thereby causing the source computing device 102A to connect with the destination computing device 102B over the public network 102 utilizing convention communication techniques.

Figure 6:
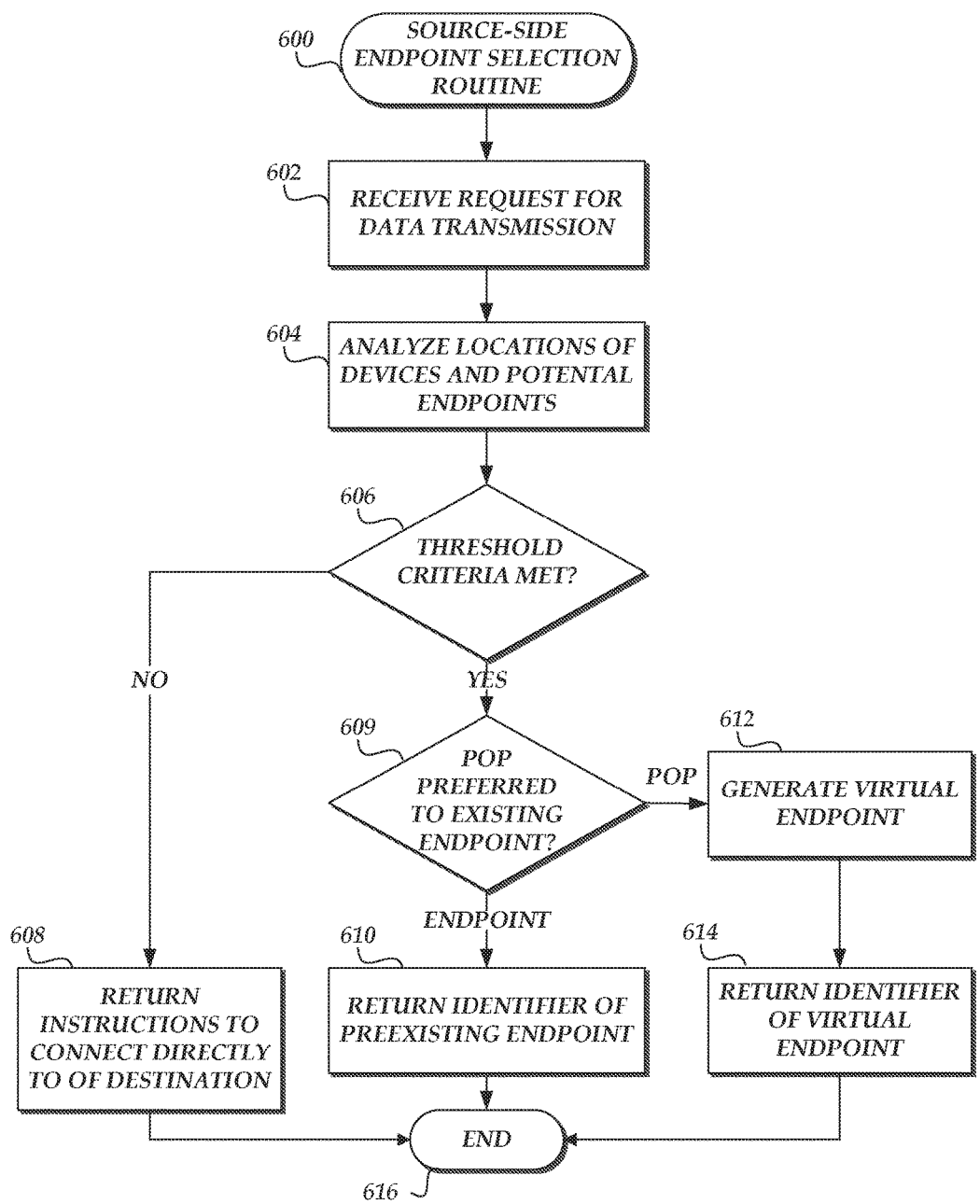
FIG. 6 is a flow chart depicting an illustrative routine for selecting a source-side endpoint within a data transmission system for use by a source computing device.

With reference to FIG. 6, one illustrative routine 600 for selecting a source-side endpoint 114 within the data transmission system 110 will be described. The routine 600 may be carried out, for example, by an endpoint selector 118 of FIG. 1, independently or in conjunction with other components of the data transmission system 110.

The routine 600 begins at block 602, where a request is received from a source computing device to initiate communication with a destination computing device. Illustratively, the request may be sent based on a configuration of the source computing device to utilize the data transmission system as a proxy for network communications. Further, the request may be sent as a part of a request to resolve a human-readable identifier (e.g., a URI) for the destination computing device into a network address (e.g., an IP address).

At block 604, the endpoint selector 118 analyzes the location data corresponding to the request, which may include locations of the source and destination computing devices as well as locations of endpoints 114 within the data transmission system 110 to which those devices may connect, to determine whether a set of threshold connection criteria are satisfied. In one embodiment, the threshold criteria may require that the source and destination computing devices are greater than a threshold network distance apart. This threshold network distance may be an absolute value (e.g., such that source and destination computing devices must be more than 100 ms in latency apart), or a relative value (e.g., such that the source and destination computing devices must be further apart in network distance than are the source device and an endpoint 114 closest to that source device). Any variety of threshold criteria may be used in an attempt to ensure that communications via the data transmission system 110 occurs in instances when that system is likely to increase data transmission speed, and that the data transmission system 110 is not utilized in other instances.

At block 606, if the endpoint selector 118 determines that the threshold criteria are not met, the routine proceeds to block 608, where the source computing device is instructed to communicate with the destination computing device at least partially outside of the private network (e.g., via traditional communication protocols and over an existing network between the source and destination computing devices). The routine 600 may then end at block 616.

Returning to block 606, if the endpoint selector 118 determines that the threshold criteria are met, the routine 600 proceeds to block 609, where the endpoint selector 118 determines whether a POP 120 is a preferred as communication point for the source computing device over an existing endpoint 114. Illustratively, a POP 120 may be a preferred communication point when the POP 120 is within a shorter network distance to the source computing device than any existing endpoint 114, when a high network quality exists between the POP 120 and the source computing device, or a combination thereof. In the instance that a POP 120 is not a preferred communication point relative to an existing endpoint 114, the routine 600 continues to block 610, where an identifier (e.g., a network address) of the closest existing endpoint 114 to the source computing device is returned to the source computing device. Thereafter, the source computing device may communicate with the destination computing device via existing endpoint 114, as described above. The routine 600 may then end at block 616.

Returning to block 609, if the endpoint selector 118 determines that a POP 120 is a preferred communication point for the source computing device than the existing endpoint 114, the routine 600 proceeds to block 612, where the endpoint selector 118 causes a new virtual endpoint 114 to be created at the POP 120. Illustratively, the endpoint selector 118 may transmit instructions to the POP 120 to provision a virtual machine with a device image including computer-executable instructions that, when executed by the virtual machine, cause the virtual machine to carry out the functionalities of an endpoint 114, as described herein. Thereafter, at block 614, the identifier of the newly created virtual endpoint 114 can be returned to the source computing device. The source computing device can then communicate with the destination computing device via existing endpoint 114, as described above. The routine 600 may then end at block 616.

One skilled in the art will appreciate that the routine 600 may include fewer or more interactions than described above. For example, in some embodiments, a determination of whether threshold criteria for use of the data transmission system 110 are met (e.g., at block 606) may also include identifying whether a POP 120 exists closer to the source computing device than an existing endpoint 114 (e.g., as described with reference to block 609). Thus, in some instances, the operations represented by these blocks may be combined, executed simultaneously, or reversed. Accordingly, the interactions of routine 600 are intended to be illustrative in nature, rather than exhaustive.

Figure 7:
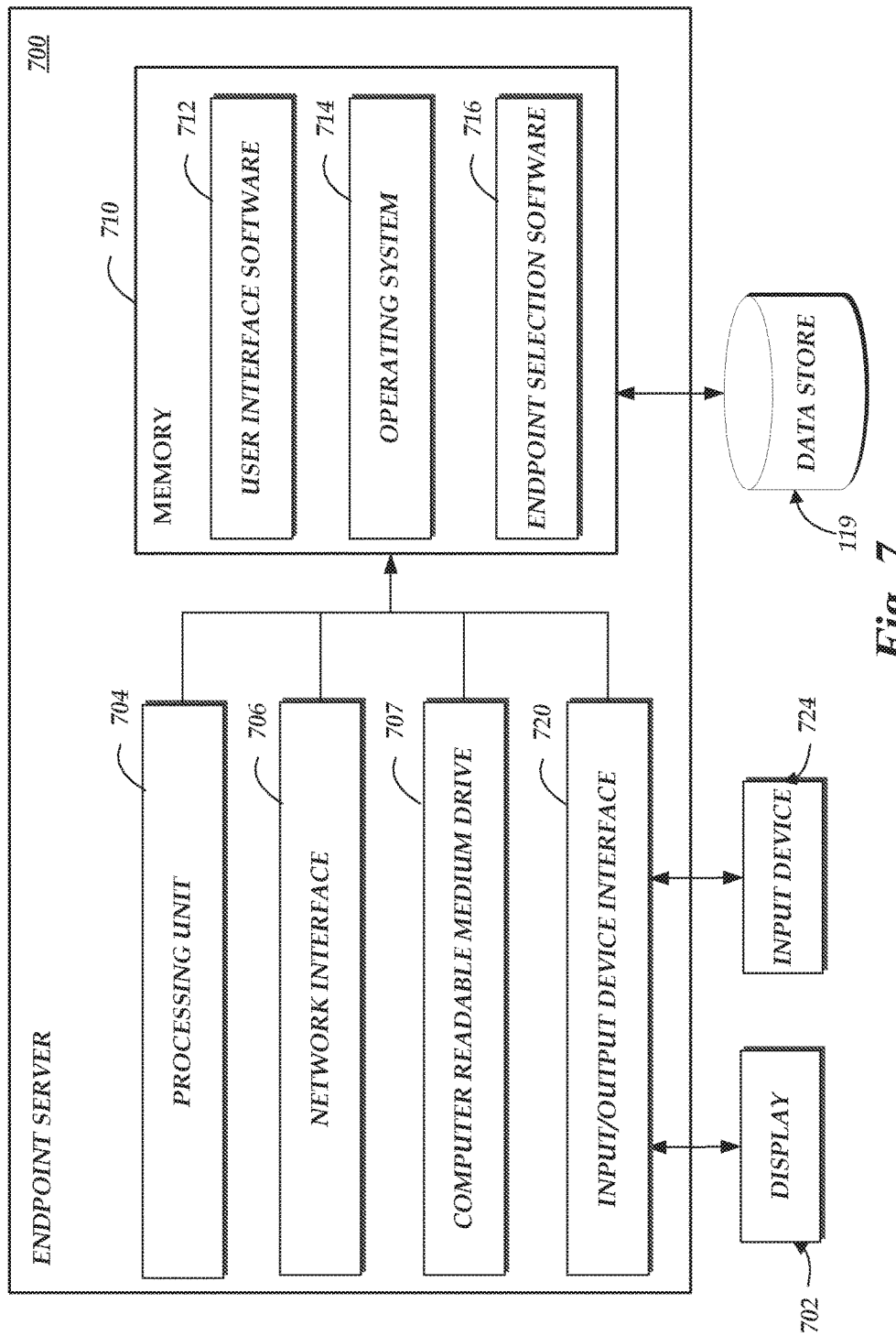
FIG. 7 is a block diagram depicting an illustrative configuration of one embodiment of an endpoint selector within the data transmission system of FIG. 1.

FIG. 7 depicts one embodiment of an architecture of a server 700 that may implement the endpoint selector 118 described herein. The general architecture of server 700 depicted in FIG. 7 includes an arrangement of computer hardware and software components that may be used to implement aspects of the present disclosure. As illustrated, the server 700 includes a processing unit 704, a network interface 706, a computer readable medium drive 707, an input/output device interface 720, a display 702, and an input device 724, all of which may communicate with one another by way of a communication bus. The network interface 706 may provide connectivity to one or more networks or computing systems, such as the public network 104 and/or private network 112 of FIG. 1. The processing unit 704 may thus receive information and instructions from other computing systems or services via a network. The processing unit 704 may also communicate to and from memory 710 and further provide output information for an optional display 702 via the input/output device interface 720. The input/output device interface 720 may also accept input from the optional input device 724, such as a keyboard, mouse, digital pen, etc. In some embodiments, the server 700 may include more (or fewer) components than those shown in FIG. 7. For example, some embodiments of the server 700 may omit the display 702 and input device 724, while providing input/output capabilities through one or more alternative communication channel (e.g., via the network interface 706).

The memory 710 may include computer program instructions that the processing unit 704 executes in order to implement one or more embodiments. The memory 710 generally includes RAM, ROM, and/or other persistent or non-transitory memory. The memory 710 may store an operating system 714 that provides computer program instructions for use by the processing unit 704 in the general administration and operation of the server 700. The memory 710 may further include computer program instructions and other information for implementing aspects of the present disclosure. For example, in one embodiment, the memory 710 includes user interface software 712 that generates user interfaces (and/or instructions therefor) for display upon a computing device, e.g., via a navigation interface such as a web browser installed on the computing device. In addition, memory 710 may include or communicate with one or more auxiliary data stores, such as data store 120.

In addition to the user interface module 712, the memory 710 may include endpoint selection software 716 that may be executed by the processing unit 704. In one embodiment, the endpoint selection software 716 implements various aspects of the present disclosure, e.g., receiving requests for data transmission via the data transmission system 110, to determining whether threshold criteria for use of the data transmission system 110 is met, and returning an identifier of an endpoint 114 within the data transmission system 110 when that threshold criteria is met. While the endpoint selection software 716 is shown in FIG. 7 as part of the server 700, in other embodiments, all or a portion of the software may be implemented individual or collectively by one or more alternative computing devices within the content delivery system 110, such as computing devices within each POP 120.

While FIG. 7 is described above with reference to implementing an endpoint selector 118, the server 700 may additionally or alternatively implement functionality corresponding to the endpoints 114 themselves. Illustratively, the memory 710 may include additional software (not shown in FIG. 7) that contains computer-executable instructions that, when executed by the server 700, causes the server 700 to implement aspects of the present disclosure, e.g., receiving data via a first stateful connection and transmitted data to an additional endpoint 114 or to a destination computing device via a second stateful connection. In other embodiments, all or a portion of the mitigation software may be implemented individually or collectively by one or more alternative computing devices within the content delivery system 110, such computing devices within each POP 120.

All of the methods and processes described above may be embodied in, and fully automated via, software code modules executed by computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
a plurality of network transmission endpoints, individual network transmission endpoints including a processor and memory and configured with computer-executable instructions to enable computing devices to transmit information to the individual network transmission endpoints for forwarding to at least one of another network transmission endpoint or a destination computing device;
a point of presence ("POP") comprising at least one computing device, the point of presence configured with computer-executable instructions to provision the at least one computing device with software enabling the at least one computing device to function as a virtual network transmission endpoint through which a first computing device communicates with a second computing device at least partly by transmitting first information to the virtual network transmission endpoint for forwarding to an additional endpoint from the plurality of network transmission endpoints and on to the second computing device; and
one or more computing devices implementing an endpoint selector, the one or more computing devices configured with specific computer-executable instructions to:
  receive a request from the first computing device to transmit the first information through at least one of the plurality of network transmission endpoints for forwarding to the second computing device, wherein the request specifies the second computing device as a destination to which the first information should be transmitted;
  determine that a network distance between the first computing device and the plurality of network transmission endpoints does not satisfy a threshold distance;
  in response to determining that the network distance between the first computing device and the plurality of network transmission endpoints does not satisfy the threshold distance:
    select the POP, based at least partly on a network distance between the first computing device and the POP, as a location in which to generate the virtual network transmission endpoint through which the first computing device communicates with the second computing device at least partly by transmitting the first information to the virtual network transmission endpoint for forwarding to the additional endpoint and on to the second computing device; and
    transmit instructions to the POP to provision the at least one computing device with the software enabling the at least one computing device to function as the virtual network transmission endpoint at least partly by receiving the first information from the first computing device to be forwarded to the additional endpoint and on to the second computing device, and forwarding the first information to the additional endpoint; and
  return an identifier of the POP to the first computing device;
wherein the at least one computing device of the POP executes the software at least partly by receiving the first information from the first computing device to be forwarded to the additional endpoint and on to the second computing device, and forwarding the first information to the additional endpoint; and wherein the computer-executable instructions of the additional endpoint cause the additional endpoint to receive the first information from at least one computing device of the POP, and forward the communications to the second computing device.

2. The system of claim 1, wherein the at least one computing device of the POP and the first computing device are in communication via a stateful communication protocol.

3. The system of claim 2, wherein the stateful communication protocol is the transmission control protocol (TCP).

4. The system of claim 1, wherein provisioning the at least one computing device with the software enabling the at least one computing device to function as the virtual network transmission endpoint comprising implementing a virtual machine instance on the at least one computing device and provisioning the virtual machine instance with the software.

5. The system of claim 1, wherein receiving the first information from the first computing device to be forwarded to the additional endpoint and on to the second computing device occurs via a public communication network, and wherein forwarding the the first information to the additional endpoint occurs via a private network not directly accessible by the first computing device.

6. The system of claim 1, wherein receiving the first information from the first computing device to be forwarded to the additional endpoint and on to the second computing device occurs via a first stateful connection, wherein forwarding the first information to the additional endpoint occurs via a second stateful connection, and wherein forwarding the first information from the additional endpoint to the second computing device occurs via a third stateful connection.

7. A computer-implemented method comprising:
as implemented by a computing device executing specific computer-executable instructions for implementing an endpoint selector within a data transmission system;
receiving a request from a first computing device to transmit information through the data transmission system for forwarding to a second computing device specified within the request as a destination to which the information should be transmitted, the data transmission system comprising at least one network transmission endpoint configured with computer-executable instructions to enable computing devices to transmit information to the individual network transmission endpoints for forwarding to at least one of another network transmission endpoint or a destination computing device;
determining that a value of a network quality metric between the first computing device and the at least one network transmission endpoint does not satisfy a threshold value;
in response to determining that the value of the network quality metric between the first computing device and the at least one network transmission endpoint does not satisfy a threshold value:
selecting a point of presence ("POP"), based at least partly on a value of the network quality metric between the first computing device and the POP, as a location in which to generate a second network transmission endpoint through which the first computing device communicates with the second computing device at least partly by transmitting the information to the second network transmission endpoint for forwarding to the second computing device; and transmitting instructions to the POP to provision a computing device of the POP with software enabling the computing device of the POP to function as the second network transmission endpoint at least partly by receiving the information from the first computing device to be forwarded to the second computing device, and forwarding the information to the second computing device; and returning an identifier of the POP to the first computing device, wherein the first computing device utilizes the identifier of the POP to communicate with the second computing device via the data transmission system.

8. The computer-implemented method of claim 7 further comprising determining the value of the network quality metric between the POP and the first computing device based at least in part on historical information regarding data transmitted on the data transmission system.

9. The computer-implemented method of claim 7 further comprising determining the value of the network quality metric between the POP and the first computing device based at least in part on transmission of network probe data.

10. The computer-implemented method of claim 7, wherein the software enabling the computing device of the POP to function as the second network transmission endpoint configures the computing device of the POP to forward the first information to the second computing device at least partly by transmitting the information received from the first computing device to the at least one network transmission endpoint for forwarding to the second computing device.

11. The computer-implemented method of claim 10, wherein the software enabling the computing device of the POP to function as the second network transmission endpoint configures the computing device of the POP to select the at least one network transmission endpoint based at least in part on a network distance between the at least one network transmission endpoint and the second computing device.

12. The computer-implemented method of claim 7, wherein the network quality metric reflects at least one of a network distance between the first computing device and the at least one network transmission endpoint, a level of packet loss occurring on a network path between the first computing device and the at least one network transmission endpoint, a frequency of errors occurring on the network path, or an availability of the network path.

13. Non-transitory computer-readable media comprising computer-executable instructions that, when executed by a computing system, cause the computing system to:
receive a request from a first computing device to send data through a data transmission system for forwarding to a destination computing device specified within the request, the data transmission system comprising at least one network transmission endpoint configured with computer-executable instructions to enable computing devices to transmit information to at least one of the network transmission endpoints for forwarding to at least one of another network transmission endpoint or the destination computing device;
determine that a value of a network quality metric of a communication path between the first computing device and the at least one network transmission endpoint, does not satisfy a threshold value;

in response to determining that the value of the network quality metric of the communication path between the first computing device and the at least one network transmission endpoint does not satisfy a threshold value:
- select a point of presence ("POP"), based at least partly on a value of the network quality metric of a communication path between the first computing device and the POP, as a location in which to generate a second network transmission endpoint through which the first computing device communicates with the destination computing device at least partly by transmitting the data to the second network transmission endpoint for forwarding to the second computing device; and
- transmit instructions to the POP to provision a computing device of the POP with software enabling the computing device of the POP to function as the second network transmission endpoint at least partly by receiving the data from the first computing device to be forwarded to the second computing device, and forwarding the data to the second computing device; and return an identifier of the POP to the first computing device.

14. The non-transitory computer-readable media of claim 13, wherein the destination computing device implements a network-accessible service.

15. The non-transitory computer-readable media of claim 13, wherein the threshold value is determined based at least in part on a network distance between the first computing device and the destination computing device.

16. The non-transitory computer-readable media of claim 15, wherein the threshold value is further determined based at least in part on a network distance between the destination computing device and the at least one network transmission endpoint.

17. The non-transitory computer-readable media of claim 13, wherein the request from a first computing device comprises a request to resolve an identifier of the destination computing device, and wherein the identifier of the POP is returned as a response to the request to resolve the identifier of the destination computing device.

18. The non-transitory computer-readable media of claim 13, wherein the identifier of the POP is at least one of a network address or a uniform resource indicator.

19. The non-transitory computer-readable media of claim 13, wherein the computer-executable instructions further cause the computing system to detect that the first computing device has not communicated with the second network transmission endpoint for at least a threshold period of time, and to transmit instructions to the POP to deactivate the second network transmission endpoint.

* * * * *